US012004120B2

(12) United States Patent
Radulescu et al.

(10) Patent No.: US 12,004,120 B2
(45) Date of Patent: *Jun. 4, 2024

(54) PAGING OPPORTUNITY MONITORING

(71) Applicant: QUALCOMM Incorporated, San Diego, CA (US)

(72) Inventors: Andrei Dragos Radulescu, La Jolla, CA (US); Jing Sun, San Diego, CA (US); Xiaoxia Zhang, San Diego, CA (US); Ozcan Ozturk, San Diego, CA (US); Peter Gaal, San Diego, CA (US); Aleksandar Damnjanovic, Del Mar, CA (US)

(73) Assignee: QUALCOMM Incorporated, San Diego, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/057,822

(22) Filed: Nov. 22, 2022

(65) Prior Publication Data
US 2023/0164743 A1 May 25, 2023

Related U.S. Application Data

(63) Continuation of application No. 16/796,750, filed on Feb. 20, 2020, now Pat. No. 11,516,770.
(Continued)

(51) Int. Cl.
*H04W 68/02* (2009.01)
*H04L 5/00* (2006.01)
(Continued)

(52) U.S. Cl.
CPC .......... *H04W 68/02* (2013.01); *H04L 5/0053* (2013.01); *H04W 68/00* (2013.01);
(Continued)

(58) Field of Classification Search
None
See application file for complete search history.

(56) References Cited

U.S. PATENT DOCUMENTS 9,769,789 B2    9/2017  Damnjanovic et al.
11,516,770 B2 * 11/2022  Radulescu ............ H04L 5/0053
(Continued)

FOREIGN PATENT DOCUMENTS

EP      3628132 A1      4/2020
WO   2018106668 A2      6/2018
WO   2020024278 A1      2/2020

OTHER PUBLICATIONS

U.S. Appl. No. 62/717,136, Tsai, filed 2018 (Year: 2018).*
(Continued)

*Primary Examiner* — Jay L Vogel
(74) *Attorney, Agent, or Firm* — Harrity & Harrity, LLP \ Qualcomm

(57) ABSTRACT

This disclosure provides systems, methods, and apparatuses for wireless communication. A user equipment (UE) may acquire a triggering synchronization signal block (SSB), which enables the UE to monitor for a floating Type-2 physical downlink control channel (PDCCH) and to determine a subset of paging occasions (POs) to monitor. Or, the UE may monitor for a fixed Type-2 PDCCH, where the UE does not require a triggering signal to monitors POs. In another aspect, the UE may monitor for a paging transmission during a monitoring period. The UE may determine the monitoring period based on received signaling. The UE may receive the signaling, during the monitoring period, indicating that the monitoring period is to be ended before a scheduled end of the monitoring period. In this way, the UE may support a continuity requirement associated with downlink reference signaling (DRS) and may support reception of paging in a shared channel.

30 Claims, 10 Drawing Sheets

Related U.S. Application Data

(60) Provisional application No. 62/830,282, filed on Apr. 5, 2019, provisional application No. 62/809,510, filed on Feb. 22, 2019.

(51) Int. Cl.
*H04W 68/00* (2009.01)
*H04W 72/0446* (2023.01)
*H04W 72/23* (2023.01)

(52) U.S. Cl.
CPC ....... *H04W 72/0446* (2013.01); *H04W 72/23* (2023.01); *H04L 5/0007* (2013.01); *H04L 5/0048* (2013.01)

(56) References Cited

U.S. PATENT DOCUMENTS

| | | | |
|---|---|---|---|
| 2013/0182626 | A1 | 7/2013 | Kuo |
| 2013/0294387 | A1* | 11/2013 | Tanaka ................ H04W 72/23 370/329 |
| 2016/0309282 | A1 | 10/2016 | Xu et al. |
| 2017/0230933 | A1 | 8/2017 | Radulescu et al. |
| 2017/0303236 | A1* | 10/2017 | Sun ..................... H04W 68/005 |
| 2019/0394749 | A1 | 12/2019 | Islam et al. |
| 2020/0053571 | A1* | 2/2020 | Tsai ..................... H04L 5/0092 |
| 2020/0383084 | A1* | 12/2020 | Kim ..................... H04L 1/0061 |
| 2021/0058894 | A1* | 2/2021 | Wang ................... H04W 76/27 |
| 2021/0127355 | A1 | 4/2021 | Gonzalez et al. |
| 2021/0153162 | A1 | 5/2021 | Chen et al. |
| 2021/0168894 | A1* | 6/2021 | Sha ..................... H04W 76/27 |
| 2021/0345455 | A1 | 11/2021 | Kodali et al. |
| 2022/0039061 | A1 | 2/2022 | Murray et al. |
| 2022/0104168 | A1* | 3/2022 | Liu ..................... H04W 68/005 |

OTHER PUBLICATIONS

CMCC: "Discussion on Remaining Issues for Search Space", 3GPP Draft, 3GPP TSG RAN WG1 Meeting #92, R1-1802040, 3rd Generation Partnership Project (3GPP), Mobile Competence Centre, 650, Route Des Lucioles, F-06921, Sophia-Antipolis Cedex, France, vol. RAN WG1. No. Athens, Greece; Feb. 26, 2018-Mar. 2, 2018, Feb. 16, 2018 (Feb. 16, 2018), XP051397136, 12 pages, p. 8, paragraph 5, Text proposal.

International Preliminary Report on Patentability—PCT/US2020/019227 The International Bureau of WIPO—Geneva, Switzerland, dated Sep. 2, 2021.

International Search Report and Written Opinion—PCT/US2020/019227—ISA/EPO—dated Nov. 2, 2020.

Nokia, et al., "Offline Discussion Summary on QCL", 3GPP TSG RAN WG1#92bis, 3GPP Draft, Draft-R1-1805690-Sanya-Offline Discussion Summary on QCL, 3rd Generation Partnership Project (3GPP), Mobile Competence Centre, 650, Route Des Lucioles, F-06921, Sophia-Antipolis Cedex, France, vol. RAN WG1, Apr. 16, 2018-Apr. 20, 2018, 20 Pages, Apr. 19, 2018 (Apr. 19, 2018), XP051427681, Apr. 16, 2018, p. 5, paragraph 4 Text proposals for 38.213, p. 14, paragraph 5.1.5.

Partial International Search Report—PCT/US2020/019227—ISA/EPO—dated Jun. 2, 2020.

Zte, et al., "Remaining Issues on PDCCH Structure", 3GPP Draft, 3GPP TSG RAN WG1 Meeting #92bis, R1-1803790, PDCCH Structure Remaining Issues, 3rd Generation Partnership Project (3GPP), Mobile Competence Centre, 650, Route Des Lucioles, F-06921, Sophia-Antipolis Cedex, France, vol. RAN WG1.No, Sanya, China; Apr. 16, 2018-Apr. 20, 2018, Apr. 6, 2018 (Apr. 6, 2018), XP051412972, 4 pages, p. 1, paragraph 2, p. 2, paragraph 3.

Interdigital Inc: "On Design of Downlink Signals and Channels for Nr-U", 3GPP Tsg Ran WG1 Meeting #95, R1-1813218, Spokane, USA, Nov. 12 - 16, 2018, 7 Pages.

\* cited by examiner

PAGING OPPORTUNITY MONITORING

CROSS-REFERENCE TO RELATED APPLICATIONS

This application is a continuation of U.S. patent application Ser. No. 16/796,750, filed Feb. 20, 2020 (now U.S. Pat. No. 11,516,770), entitled "PAGING OPPORTUNITY MONITORING," which claims priority to U.S. Provisional Patent Application No. 62/809,510, filed on Feb. 22, 2019, entitled "TYPE-2 PHYSICAL DOWNLINK CONTROL CHANNEL (PDCCH) MONITORING," and to U.S. Provisional Patent Application No. 62/830,282, filed on Apr. 5, 2019, entitled "PAGING OPPORTUNITY MONITORING," and assigned to the assignee hereof. The disclosure of the prior applications are considered part of and are incorporated by reference in this patent application.

TECHNICAL FIELD

Aspects of the present disclosure generally relate to wireless communication, and more particularly to techniques and apparatuses for paging opportunity monitoring.

DESCRIPTION OF THE RELATED TECHNOLOGY

Wireless communication systems are widely deployed to provide various telecommunication services such as telephony, video, data, messaging, and broadcasts. Typical wireless communication systems may employ multiple-access technologies capable of supporting communication with multiple users by sharing available system resources (for example, bandwidth, transmit power, etc.). Examples of such multiple-access technologies include code division multiple access (CDMA) systems, time division multiple access (TDMA) systems, frequency-division multiple access (FDMA) systems, orthogonal frequency-division multiple access (OFDMA) systems, single-carrier frequency-division multiple access (SC-FDMA) systems, time division synchronous code division multiple access (TD-SCDMA) systems, and Long Term Evolution (LTE). LTE/LTE-Advanced is a set of enhancements to the Universal Mobile Telecommunications System (UMTS) mobile standard promulgated by the Third Generation Partnership Project (3GPP).

A wireless communication network may include a number of base stations (BSs) that can support communication for a number of user equipment (UEs). A user equipment (UE) may communicate with a base station (BS) via the downlink (DL) and uplink (UL). The DL (or forward link) refers to the communication link from the BS to the UE, and the UL (or reverse link) refers to the communication link from the UE to the BS. As will be described in more detail herein, a BS may be referred to as a NodeB, an LTE evolved nodeB (eNB), a gNB, an access point (AP), a radio head, a transmit receive point (TRP), a New Radio (NR) BS, or a 5G NodeB.

The above multiple access technologies have been adopted in various telecommunication standards to provide a common protocol that enables different user equipment to communicate on a municipal, national, regional, and even global level. NR, which also may be referred to as 5G, is a set of enhancements to the LTE mobile standard promulgated by the Third Generation Partnership Project (3GPP). NR is designed to better support mobile broadband Internet access by improving spectral efficiency, lowering costs, improving services, making use of new spectrum, and better integrating with other open standards using OFDM with a cyclic prefix (CP) (CP-OFDM) on the DL, using CP-OFDM or SC-FDM (for example, also known as discrete Fourier transform spread OFDM (DFT-s-OFDM)) on the UL (or a combination thereof), as well as supporting beamforming, multiple-input multiple-output (MIMO) antenna technology, and carrier aggregation.

SUMMARY

The systems, methods and devices of this disclosure each have several innovative aspects, no single one of which is solely responsible for the desirable attributes disclosed herein.

One innovative aspect of the subject matter described in this disclosure can be implemented in a method of wireless communication performed by an apparatus of a user equipment (UE). The method may include determining a plurality of resource locations associated with a Type-2 physical downlink control channel (PDCCH) transmission, where the Type-2 PDCCH is a floating Type-2 PDCCH or a fixed Type-2 PDCCH; and monitoring the resource location to attempt to receive the Type-2 PDCCH.

In some aspects, a configuration of the Type-2 PDCCH defaults to a configuration of a Type-0 PDCCH. In some aspects, the Type-2 PDCCH is associated with a common core resource set with a Type-0 PDCCH. In some aspects, a monitoring period for the monitoring is defined based at least in part on at least one of: a timer expiration for the Type-2 PDCCH, a detection of one or more Type-0 PDCCH core resource sets (CORESETs) without a paging radio network temporary identifier (P-RNTI), or a detection of a Type-2 PDCCH CORESET with a P-RNTI.

In some aspects, the Type-2 PDCCH occurs during or after a downlink reference signal (DRS) transmission period. In some aspects, the method may include triggering a paging monitoring timer associated with a monitoring period for the monitoring based at least in part on detection of a DRS transmission. In some aspects, the method may include detecting the DRS transmission based at least in part on at least one of a synchronization signal block detection, a Type-0 PDCCH detection, or a Type-2 PDCCH detection.

In some aspects, a monitoring period for the monitoring is defined with respect to a Type-0 PDCCH transmission that is detectable based at least in part on at least one of a CORESET demodulation reference signal (DMRS) parameter, a remaining minimum system information (RMSI) allocation parameter, or a synchronization signal block (SSB) detection parameter.

In some aspects, a monitoring period for the monitoring is defined with respect to a Type-2 PDCCH transmission that is detectable based at least in part on at least one of a CORESET DMRS parameter, a paging radio network temporary identifier (P-RNTI) allocation parameter, or an SSB detection parameter.

In some aspects, the monitoring includes monitoring for the Type-2 PDCCH based at least in part on a quasi-co-location (QCL) relationship for the Type-2 PDCCH. In some aspects, the resource location associated with the Type-2 PDCCH is associated with a fixed mapping QCL relationship. In some aspects, the Type-2 PDCCH is associated with a same slot as a SSB or is offset from the SSB by a particular period of time. In some aspects, the particular period of time is defined based at least in part on a stored period or a configured period.

In some aspects, the resource location of the Type-2 PDCCH is associated with a particular set of candidate QCL locations. In some aspects, the particular set of candidate QCL locations are restricted based at least in part on at least one of a repetition period, an offset value, or a monitoring duration with respect to a detected synchronization signal block or a time value derived from a system timing.

In some aspects, the resource location of the Type-2 PDCCH is associated with a QCL location at each Type-2 PDCCH opportunity within a monitoring window associated with a monitoring period for the monitoring. In some aspects, a downlink control information (DCI) of the Type-2 PDCCH indicates a k0 parameter value identifying a subsequent allocation for a physical downlink shared channel (PDSCH) carrying a paging message. In some aspects, a Type-2 PDSCH is associated with a k0 parameter table identifying a set of k0 parameters for allocations after a DRS that satisfy at least one of an occupied channel bandwidth (OCB) requirement, a continuity requirement, or a capacity requirement.

In some aspects, the OCB requirement is at least one of a requirement for different wideband QCL allocations that are time-division multiplexed (TDM) or a requirement for different narrowband WCL allocations that are frequency division multiplexed (FDM). In some aspects, a monitoring period for the monitoring is associated with multiple paging occasion windows (POWs) in each DRS transmission period.

In some aspects, multiple of Type-2 PDCCH CORESET candidates are mapped within a single channel occupancy time (COT). In some aspects, each of multiple Type-2 PDSCH allocations for paging occupies symbols between two successive Type-2 PDCCH CORESET candidates. In some aspects, a DCI message in the Type-2 PDCCH or a Type-2 PDCCH allocation includes an indicator of whether additional Type-2 PDCCH allocations with a same QCL parameter are to be provided and a location of the additional Type-2 PDCCH allocations.

In some aspects, the Type-2 PDCCH is associated with a telescoping Type-2 PDCCH CORESET map and a mapping is selected for COT paging compactness. In some aspects, a telescoping Type-2 PDCCH CORESET map refers to a set of Type-2 PDCCH CORESET candidates with a same QCL parameter. In some aspects, a monitoring period for the monitoring is determined based at least in part on a paging COT continuity constraint associated with a paging capacity requirement. In some aspects, a monitoring period for the monitoring is defined based at least in part on an early termination timer. In some aspects, the UE is configured to stop monitoring QCL Type-2 PDCCH candidates when a termination timer has expired and after a signal associated with DRS. In some aspects, the monitoring includes detecting the Type-2 PDCCH without having detected a DRS.

In some aspects, the monitoring includes monitoring for the Type-2 PDCCH after a downlink reference signal is detected. In some aspects, the UE may end the monitoring for the Type-2 PDCCH based at least in part on not detecting paging before an expiration of an early termination timer or before an expiration of a paging monitoring window. In some aspects, the UE may determine a paging configuration. In some aspects, the UE may monitor based at least in part on the paging configuration.

In some aspects, the paging configuration is at least one of a DRS-conditional POW with a set of possible start and length indicator values, a DRS-conditional POW with a threshold periodicity, a paging window with a set of possible international mobile subscriber identity (IMSI) messages, a low-capacity paging configuration, or, a high-capacity paging configuration. In some aspects, determining the paging configuration includes determining the paging configuration based at least in part on at least one of a radio resource control (RRC) paging message, an RRC information element (IE), a DCI flag associated with a paging radio network temporary identifier (RNTI), a DCI flag associated with a system information radio network temporary identifier (SI-RNTI), or a physical broadcast channel (PBCH) flag. In some aspects, determining the paging configuration includes switching from a high-capacity paging configuration to a low-capacity paging configuration based at least in part on at least one of a timer expiration or a triggering message.

Another innovative aspect of the subject matter described in this disclosure can be implemented in a UE for wireless communication. The UE may include memory and one or more processors operatively coupled to the memory. The memory and the one or more processors may be configured to determine a plurality of resource locations associated with a Type-2 PDCCH transmission, where the Type-2 PDCCH is a floating Type-2 PDCCH or a fixed Type-2 PDCCH; and monitor the resource location to attempt to receive the Type-2 PDCCH.

Another innovative aspect of the subject matter described in this disclosure can be implemented in a non-transitory computer-readable medium. The non-transitory computer-readable medium may store one or more instructions for wireless communication. The one or more instructions, when executed by one or more processors of a UE, may cause the one or more processors to determine a plurality of resource locations associated with a Type-2 PDCCH transmission, where the Type-2 PDCCH is a floating Type-2 PDCCH or a fixed Type-2 PDCCH; and monitor the resource location to attempt to receive the Type-2 PDCCH.

Another innovative aspect of the subject matter described in this disclosure can be implemented in an apparatus for wireless communication. The apparatus may include means for determining a plurality of resource locations associated with a Type-2 PDCCH transmission, where the Type-2 PDCCH is a floating Type-2 PDCCH or a fixed Type-2 PDCCH; and means for monitoring the resource location to attempt to receive the Type-2 PDCCH.

Another innovative aspect of the subject matter described in this disclosure can be implemented in a method of wireless communication, performed by an apparatus of a UE. The method may include receiving signaling identifying a resource location of at least one of a start, an end, or a duration of a monitoring period for a paging opportunity; and monitoring, during the monitoring period, for a paging transmission associated with the paging opportunity based on the at least one of the start, the end, or the duration of the monitoring period.

In some aspects, the paging transmission is associated with a PDCCH. In some aspects, the resource location is at least one of a starting resource location for the monitoring period or a stopping resource location for the monitoring period. In some aspects, the signaling is at least one of a system information radio network temporary identifier (SI-RNTI)-scrambling of a downlink control information (DCI), a paging radio network temporary identifier (P-RNTI)-scrambling of a DCI, a DCI, a DCI explicitly carrying the signaling, a DCI implicitly indicating the signaling, a channel occupancy time start signal, or a channel occupancy time end signal.

In some aspects, the signaling includes at least one of a flag identifying whether paging is to be further monitored in the monitoring period, a bitmap indicating a set of UEs to which the signaling applies, a change to a DCI configuration, a starting time for monitoring for a paging DCI, a resource indication for monitoring for a paging DCI, a periodicity identifier for the paging transmission, a payload message, a paging message, or a SI-RNTI scrambling. In some aspects, the method may include receiving further signaling during monitoring of the monitoring period and selectively monitoring in accordance with the further signaling. In some aspects, selectively monitoring in accordance with the further signaling includes continuing to monitor based on the signaling indicating that further paging is to be transmitted. In some aspects, selectively monitoring in accordance with the further signaling includes ending monitoring based on the signaling indicating that further paging is not to be transmitted.

In some aspects, the further signaling is at least one of a SI-RNTI-scrambled DCI, a P-RNTI-scrambled DCI, a DCI, a physical signal, or a monitored signal. In some aspects, the monitoring period may be a single contiguous interval. In some aspects, the monitoring period may be a plurality of disjointed intervals. In some aspects receiving the signaling includes receiving signaling during the monitoring period. In some aspects, the method may include determining, based at least in part on the signaling identifying the resource location of the end of the monitoring period, that the paging transmission is not to occur at a time subsequent to receiving the signaling; and monitoring, during the monitoring period, for the paging transmission may include ending the monitoring period.

Another innovative aspect of the subject matter described in this disclosure can be implemented in a UE for wireless communication. The UE may include memory and one or more processors operatively coupled to the memory. The memory and the one or more processors may be configured to receive signaling identifying a resource location of at least one of a start, an end, or a duration of a monitoring period for a paging opportunity; and monitor, during the monitoring period, for a paging transmission associated with the paging opportunity based on the at least one of the start, the end, or the duration of the monitoring period.

Another innovative aspect of the subject matter described in this disclosure can be implemented in a non-transitory computer-readable medium. The non-transitory computer-readable medium may store one or more instructions for wireless communication. The one or more instructions, when executed by one or more processors of a UE, may cause the one or more processors to receive signaling identifying a resource location of at least one of a start, an end, or a duration of a monitoring period for a paging opportunity; and monitor, during the monitoring period, for a paging transmission associated with the paging opportunity based on the at least one of the start, the end, or the duration of the monitoring period.

Another innovative aspect of the subject matter described in this disclosure can be implemented in an apparatus for wireless communication. The apparatus may include means for receiving signaling identifying a resource location of at least one of a start, an end, or a duration of a monitoring period for a paging opportunity; and means for monitoring, during the monitoring period, for a paging transmission associated with the paging opportunity based on the at least one of the start, the end, or the duration of the monitoring period.

Aspects generally include a method, apparatus, system, computer program product, non-transitory computer-readable medium, user equipment, base station, wireless communication device, and processing system as substantially described herein with reference to and as illustrated by the accompanying drawings and specification.

Details of one or more implementations of the subject matter described in this disclosure are set forth in the accompanying drawings and the description below. Other features, aspects, and advantages will become apparent from the description, the drawings and the claims. Note that the relative dimensions of the following figures may not be drawn to scale.

BRIEF DESCRIPTION OF THE DRAWINGS

Like reference numbers and designations in the various drawings indicate like elements.

DETAILED DESCRIPTION

Figure 1:
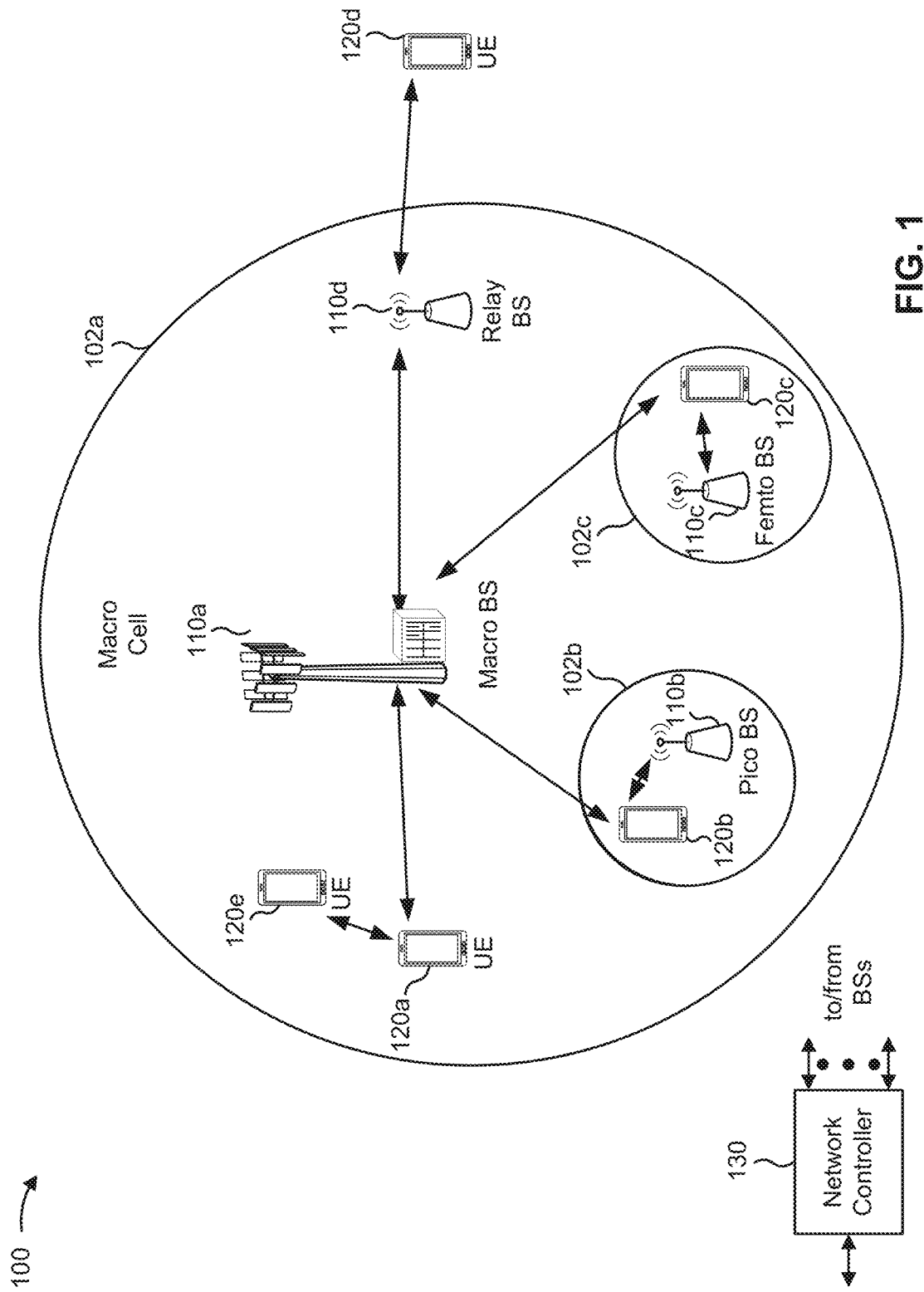
FIG. 1 is a block diagram conceptually illustrating an example of a wireless network.

The following description is directed to certain implementations for the purposes of describing the innovative aspects of this disclosure. However, a person having ordinary skill in the art will readily recognize that the teachings herein can be applied in a multitude of different ways. Some of the examples in this disclosure are based at least in part on wireless and wired local area network (LAN) communication according to the Institute of Electrical and Electronics Engineers (IEEE) 802.11 wireless standards, the IEEE 802.3 Ethernet standards, and the IEEE 1901 Powerline communication (PLC) standards. However, the described implementations may be implemented in any device, system or network that is capable of transmitting and receiving radio frequency signals according to any of the wireless communication standards, including any of the IEEE 802.11 standards, the Bluetooth® standard, code division multiple access (CDMA), frequency division multiple access (FDMA), time division multiple access (TDMA), Global System for Mobile communications (GSM), GSM/General Packet Radio Service (GPRS), Enhanced Data GSM Environment (EDGE), Terrestrial Trunked Radio (TETRA), Wideband-CDMA (W-CDMA), Evolution Data Optimized (EV-DO), 1xEV-DO, EV-DO Rev A, EV-DO Rev B, High Speed Packet Access (HSPA), High Speed Downlink Packet Access (HSDPA), High Speed Uplink Packet Access (HSUPA), Evolved High Speed Packet Access (HSPA+), Long Term Evolution (LTE), AMPS, or other known signals that are used to communicate within a wireless, cellular or internet of things (IOT) network, such as a system utilizing 3G, 4G or 5G, or further implementations thereof, technology.

In New Radio (NR), a downlink reference signal (DRS) continuity requirement may be established. For example, a BS may continuously transmit a DRS in a single channel occupancy time (COT). To maintain continuity, the BS may multiplex remaining minimum system information (RMSI) and synchronization signal block (SSB) transmissions. For example, an RMSI physical downlink control channel (PDCCH) may be time division multiplexed with an SSB or an RMSI physical downlink shared channel (PDSCH) may be frequency division multiplexed (FDM) with an SSB. In this way, the BS may ensure a compact, continuous DRS. Further, the BS may transmit paging information and other system information (OSI) transmissions in a common COT with a DRS.

To achieve the continuous DRS requirement, the BS may transmit using a set of SSB candidates when the BS obtains access to transmission resources using, for example, a contention-based access procedure, such as a listen-before-talk (or listen-before-transmit, LBT) procedure. Further, to achieve the continuous DRS requirement, the UE may be enabled to monitor multiple paging occasion (PO) candidates of a paging occasion window (POW) at a fixed location or based at least in part on a flexible mapping of detected DRSs or known quasi-co location (QCL) relationships to floating or fixed PO candidate locations. Some aspects described herein provide for floating position monitoring and fixed position monitoring for UE or for paging opportunity monitoring. For example, a UE may determine a resource location for a Type-2 PDCCH, such as a floating Type-2 PDCCH or a fixed Type-2 PDCCH, and may monitor to attempt to receive the Type-2 PDCCH. As another example, a UE may receive signaling identifying a resource location and may monitor for a paging transmission during a monitoring occasion. In some implementations, the monitoring occasion may be determined based on the signaling.

Particular implementations of the subject matter described in this disclosure can be implemented to realize one or more of the following potential advantages. For example, the UE may enable the BS to satisfy the DRS continuity requirement, may enable an efficient utilization of network resources and may enable flexibility with regard to utilization of network resources. Moreover, the UE and the BS may enable increased network flexibility with regard to support by enabling different types of PDCCH configurations or different types of UE configurations to be deployed in a network, as described in more detail herein. Furthermore, by enabling a dynamically indicated starting condition, stopping condition, or duration for a monitoring period, the UE may reduce utilization of power resources relative to starting a monitoring period before paging is to be performed or relative to remaining in a monitoring period after further paging is not to be performed. Furthermore, back-to-back transmission of DRS and paging messages, enabled by increasing a quantity of paging candidates for the BS to select, enables the BS to limit shared spectrum utilization by aggregating the DRS, paging, or other signals into a single transmission.

FIG. 1 is a block diagram conceptually illustrating an example of a wireless network 100. The wireless network 100 may be an LTE network or some other wireless network, such as a 5G or NR network. Wireless network 100 may include a number of BSs 110 (shown as BS 110a, BS 110b, BS 110c, and BS 110d) and other network entities. A BS is an entity that communicates with user equipment (UEs) and also may be referred to as a base station, a NR BS, a Node B, a gNB, a 5G node B (NB), an access point, or a transmit receive point (TRP). Each BS may provide communication coverage for a particular geographic area. In 3GPP, the term "cell" can refer to a coverage area of a BS, a BS subsystem serving this coverage area, or a combination thereof, depending on the context in which the term is used.

A BS may provide communication coverage for a macro cell, a pico cell, a femto cell, another type of cell, or a combination thereof. A macro cell may cover a relatively large geographic area (for example, several kilometers in radius) and may allow unrestricted access by UEs with service subscription. A pico cell may cover a relatively small geographic area and may allow unrestricted access by UEs with service subscription. A femto cell may cover a relatively small geographic area (for example, a home) and may allow restricted access by UEs having association with the femto cell (for example, UEs in a closed subscriber group (CSG)). A BS for a macro cell may be referred to as a macro BS. A BS for a pico cell may be referred to as a pico BS. A BS for a femto cell may be referred to as a femto BS or a home BS. In the example shown in FIG. 1, a BS 110a may be a macro BS for a macro cell 102a, a BS 110b may be a pico BS for a pico cell 102b, and a BS 110c may be a femto BS for a femto cell 102c. A BS may support one or multiple (for example, three) cells. The terms "eNB", "base station", "NR BS", "gNB", "TRP", "AP", "node B", "5G NB", and "cell" may be used interchangeably herein.

In some examples, a cell may not necessarily be stationary, and the geographic area of the cell may move according to the location of a mobile BS. In some examples, the BSs may be interconnected to one another as well as to one or more other BSs or network nodes (not shown) in the wireless network 100 through various types of backhaul interfaces, such as a direct physical connection, a virtual network, or a combination thereof using any suitable transport network.

Wireless network 100 also may include relay stations. A relay station is an entity that can receive a transmission of data from an upstream station (for example, a BS or a UE) and send a transmission of the data to a downstream station (for example, a UE or a BS). A relay station also may be a UE that can relay transmissions for other UEs. In the example shown in FIG. 1, a relay station 110d may communicate with a macro BS 110a and a UE 120d in order to facilitate communication between the macro BS 110a and the UE 120d. A relay station also may be referred to as a relay BS, a relay base station, a relay, etc.

A wireless network 100 may be a heterogeneous network that includes BSs of different types, for example, macro BSs, pico BSs, femto BSs, relay BSs, etc. These different types of BSs may have different transmit power levels, different coverage areas, and different impacts on interference in the wireless network 100. For example, macro BSs may have a high transmit power level (for example, 5 to 40 Watts) whereas pico BSs, femto BSs, and relay BSs may have lower transmit power levels (for example, 0.1 to 2 Watts).

A network controller 130 may couple to a set of BSs and may provide coordination and control for these BSs. The network controller 130 may communicate with the BSs via a backhaul. The BSs also may communicate with one another, for example, directly or indirectly via a wireless or wireline backhaul.

UEs 120 (for example, 120a, 120b, 120c) may be dispersed throughout the wireless network 100, and each UE may be stationary or mobile. A UE also may be referred to as an access terminal, a terminal, a mobile station, a subscriber unit, a station, etc. A UE may be a cellular phone (for example, a smart phone), a personal digital assistant (PDA), a wireless modem, a wireless communication device, a handheld device, a laptop computer, a cordless phone, a wireless local loop (WLL) station, a tablet, a camera, a gaming device, a netbook, a smartbook, an ultrabook, a medical device or equipment, biometric sensors/devices, wearable devices (smart watches, smart clothing, smart glasses, smart wrist bands, smart jewelry (for example, smart ring, smart bracelet)), an entertainment device (for example, a music or video device, or a satellite radio), a vehicular component or sensor, smart meters/sensors, industrial manufacturing equipment, a global positioning system device, or any other suitable device that is configured to communicate via a wireless or wired medium.

Some UEs may be considered machine-type communication (MTC) or evolved or enhanced machine-type communication (eMTC) UEs. MTC and eMTC UEs include, for example, robots, drones, remote devices, sensors, meters, monitors, location tags, etc., that may communicate with a base station, another device (for example, remote device), or some other entity. A wireless node may provide, for example, connectivity for or to a network (for example, a wide area network such as Internet or a cellular network) via a wired or wireless communication link. Some UEs may be considered Internet-of-Things (IoT) devices or may be implemented as NB-IoT (narrowband internet of things) devices. Some UEs may be considered a Customer Premises Equipment (CPE). A UE 120 may be included inside a housing that houses components of the UE 120, such as processor components, memory components, similar components, or a combination thereof.

In general, any number of wireless networks may be deployed in a given geographic area. Each wireless network may support a particular RAT and may operate on one or more frequencies. A RAT also may be referred to as a radio technology, an air interface, etc. A frequency also may be referred to as a carrier, a frequency channel, etc. Each frequency may support a single RAT in a given geographic area in order to avoid interference between wireless networks of different RATs. In some cases, NR or 5G RAT networks may be deployed.

In some examples, access to the air interface may be scheduled, where a scheduling entity (for example, a base station) allocates resources for communication among some or all devices and equipment within the scheduling entity's service area or cell. Within the present disclosure, as discussed further below, the scheduling entity may be responsible for scheduling, assigning, reconfiguring, and releasing resources for one or more subordinate entities. That is, for scheduled communication, subordinate entities utilize resources allocated by the scheduling entity.

Base stations are not the only entities that may function as a scheduling entity. That is, in some examples, a UE may function as a scheduling entity, scheduling resources for one or more subordinate entities (for example, one or more other UEs). In this example, the UE is functioning as a scheduling entity, and other UEs utilize resources scheduled by the UE for wireless communication. A UE may function as a scheduling entity in a peer-to-peer (P2P) network, in a mesh network, or another type of network. In a mesh network example, UEs may optionally communicate directly with one another in addition to communicating with the scheduling entity.

Thus, in a wireless communication network with a scheduled access to time-frequency resources and having a cellular configuration, a P2P configuration, and a mesh configuration, a scheduling entity and one or more subordinate entities may communicate utilizing the scheduled resources.

In some aspects, two or more UEs 120 (for example, shown as a UE 120*a* and a UE 120*e*) may communicate directly using one or more sidelink channels (for example, without using a base station 110 as an intermediary to communicate with one another). For example, the UEs 120 may communicate using peer-to-peer (P2P) communications, device-to-device (D2D) communications, a vehicle-to-everything (V2X) protocol (which may include a vehicle-to-vehicle (V2V) protocol, a vehicle-to-infrastructure (V2I) protocol, or similar protocol), a mesh network, or similar networks, or combinations thereof. In this case, the UEs 120 may perform scheduling operations, resource selection operations, as well as other operations described elsewhere herein as being performed by the base station 110.

Figure 2:
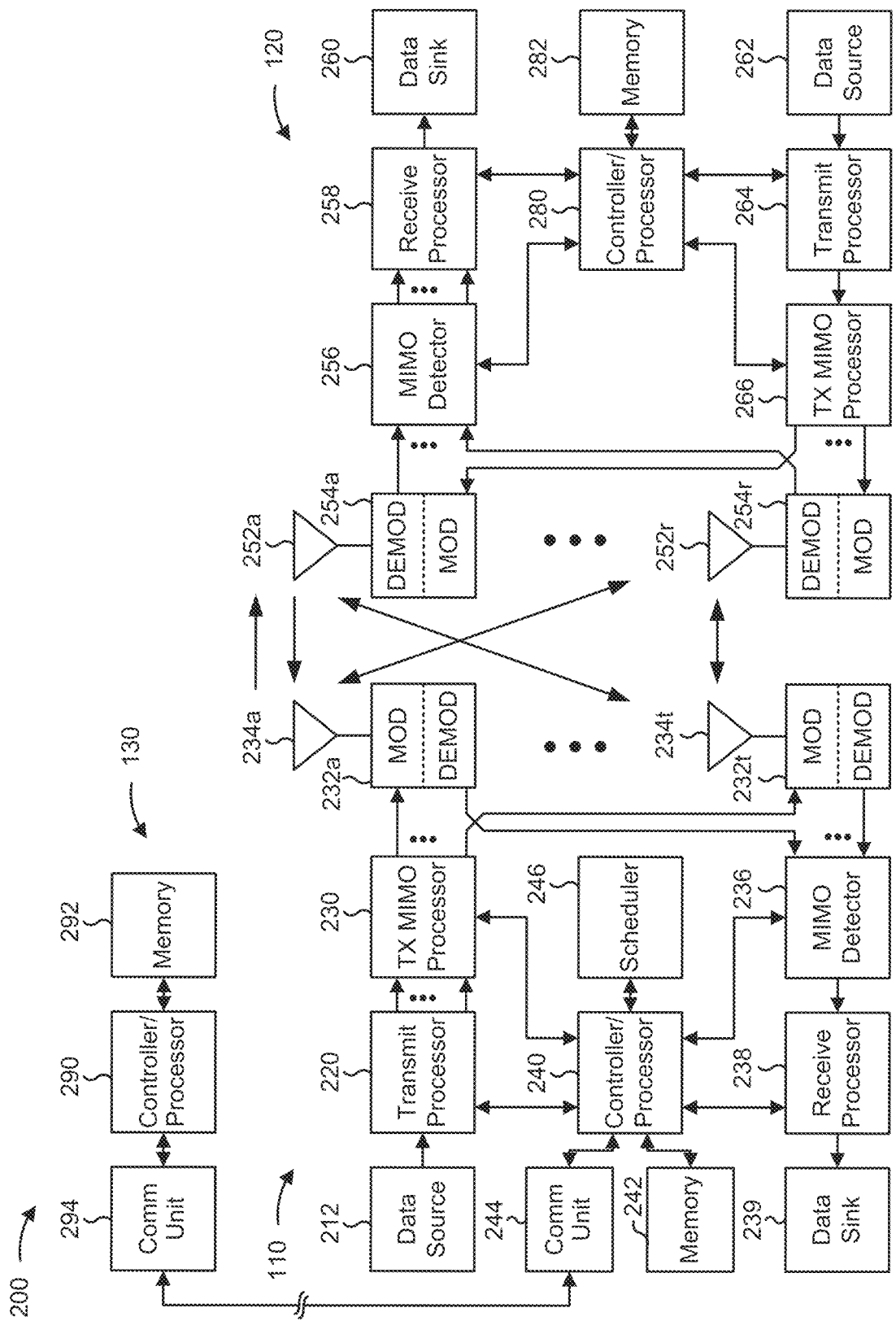
FIG. 2 is a block diagram conceptually illustrating an example of a base station (BS) in communication with a user equipment (UE) in a wireless network.

FIG. 2 is a block diagram conceptually illustrating an example 200 of a base station 110 in communication with a UE 120. In some aspects, the base station 110 and the UE 120 may respectively be one of the base stations and one of the UEs in the wireless network 100 of FIG. 1. The base station 110 may be equipped with T antennas 234*a* through 234*t*, and the UE 120 may be equipped with R antennas 252*a* through 252*r*, where in general T≥1 and R≥1.

At the base station 110, a transmit processor 220 may receive data from a data source 212 for one or more UEs, select one or more modulation and coding schemes (MCS) for each UE based at least in part on channel quality indicators (CQIs) received from the UE, process (for example, encode and modulate) the data for each UE based at least in part on the MCS(s) selected for the UE, and provide data symbols for all UEs. A transmit processor 220 also may process system information (for example, for semi-static resource partitioning information (SRPI), etc.) and control information (for example, CQI requests, grants, upper layer signaling, etc.) and provide overhead symbols and control symbols. The transmit processor 220 also may generate reference symbols for reference signals (for example, the cell-specific reference signal (CRS)) and synchronization signals (for example, the primary synchronization signal (PSS) and secondary synchronization signal (SSS)). A transmit (TX) multiple-input multiple-output (MIMO) processor 230 may perform spatial processing (for example, precoding) on the data symbols, the control symbols, the overhead symbols, or the reference symbols, if applicable, and may provide T output symbol streams to T modulators (MODs) 232*a* through 232*t*. Each modulator 232 may process a respective output symbol stream (for example, for OFDM, etc.) to obtain an output sample stream. Each modulator 232 may further process (for example, convert to analog, amplify, filter, and upconvert) the output sample stream to obtain a downlink signal. T downlink signals from modulators 232*a* through 232*t* may be transmitted via T antennas 234*a* through 234*t*, respectively. According to various aspects described in more detail below, the synchronization signals can be generated with location encoding to convey additional information.

At the UE 120, antennas 252*a* through 252*r* may receive the downlink signals from the base station 110 or other base stations and may provide received signals to demodulators (DEMODs) 254*a* through 254*r*, respectively. Each demodulator 254 may condition (for example, filter, amplify, downconvert, and digitize) a received signal to obtain input samples. Each demodulator 254 may further process the input samples (for example, for OFDM, etc.) to obtain received symbols. A MIMO detector 256 may obtain received symbols from all R demodulators 254*a* through 254*r*, perform MIMO detection on the received symbols if applicable, and provide detected symbols. A receive processor 258 may process (for example, demodulate and decode) the detected symbols, provide decoded data for UE 120 to a data sink 260, and provide decoded control information and system information to a controller or processor (controller/ processor) 280. A channel processor may determine reference signal received power (RSRP), received signal strength indicator (RSSI), reference signal received quality (RSRQ), channel quality indicator (CQI), etc. In some aspects, one or more components of the UE 120 may be included in a housing.

On the uplink, at the UE 120, a transmit processor 264 may receive and process data from a data source 262 and control information (for example, for reports including RSRP, RSSI, RSRQ, CQI, etc.) from a controller/processor 280. The transmit processor 264 also may generate reference symbols for one or more reference signals. The symbols from the transmit processor 264 may be precoded by a TX MIMO processor 266 if applicable, further processed by the modulators 254a through 254r (for example, for DFT-s-OFDM, CP-OFDM, etc.), and transmitted to the base station 110. At the base station 110, the uplink signals from the UE 120 and other UEs may be received by the antennas 234, processed by the demodulators 232, detected by a MIMO detector 236 if applicable, and further processed by a receive processor 238 to obtain decoded data and control information sent by the UE 120. The receive processor 238 may provide the decoded data to a data sink 239 and the decoded control information to a controller or processor (controller/processor) 240. The base station 110 may include a communication unit 244 and communicate to a network controller 130 via the communication unit 244. The network controller 130 may include a communication unit 294, a controller or processor (controller/processor) 290, and a memory 292.

While subsequent paragraphs may refer to Type-2 PDCCH, paging allocations and corresponding monitoring windows, PDSCHs, and candidates, it will be understood that the same descriptions apply to other broadcast allocations, such as Type-0A PDCCH and OSI (Other System Information) allocations.

The controller/processor 240 of the base station 110, the controller/processor 280 of the UE 120, or any other component(s) of FIG. 2 may perform one or more techniques associated with Type-2 PDCCH monitoring, as described in more detail elsewhere herein. For example, the controller/processor 240 of the base station 110, the controller/processor 280 of the UE 120, or any other component(s) (or combinations of components) of FIG. 2 may perform or direct operations of, for example, a process 800 of FIG. 8, process 1000 of FIG. 10, or other processes as described herein. The memories 242 and 282 may store data and program codes for the base station 110 and the UE 120, respectively. A scheduler 246 may schedule UEs for data transmission on the downlink, the uplink, or a combination thereof.

Figure 8:
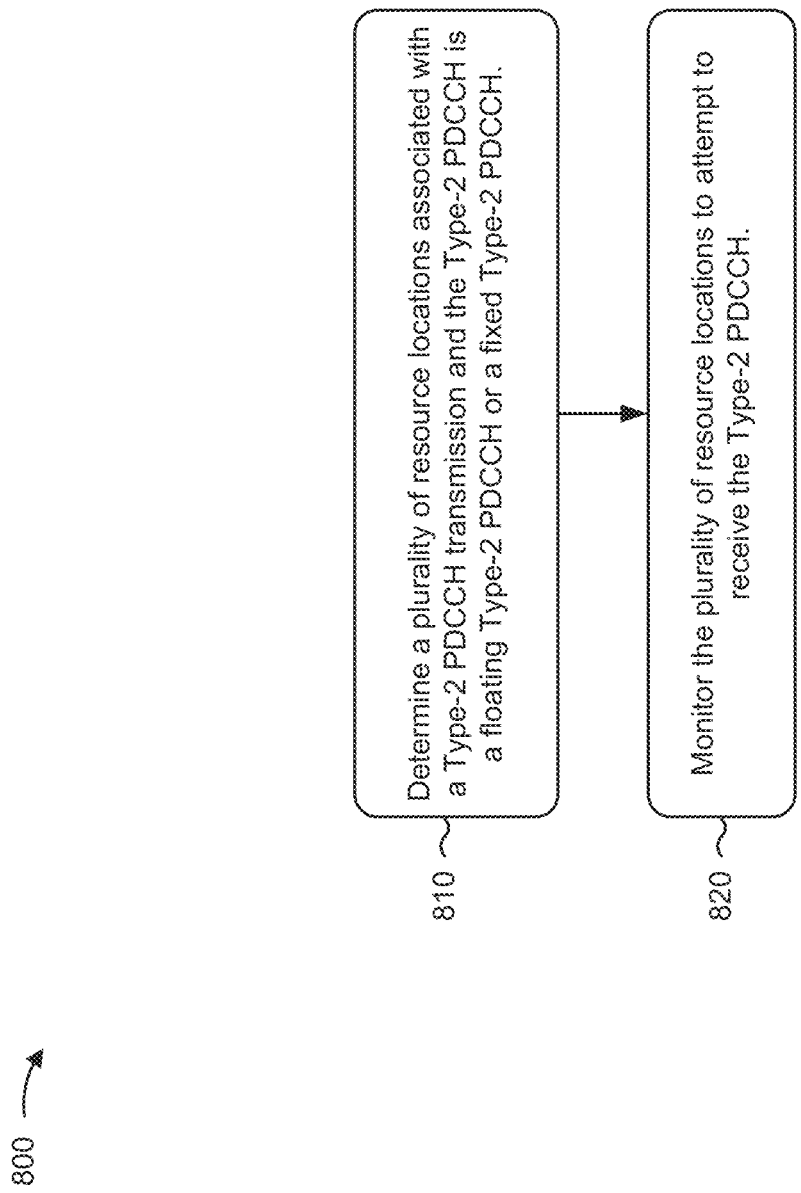
FIG. 8 is a diagram illustrating an example process performed, for example, by a UE.
Figure 10:
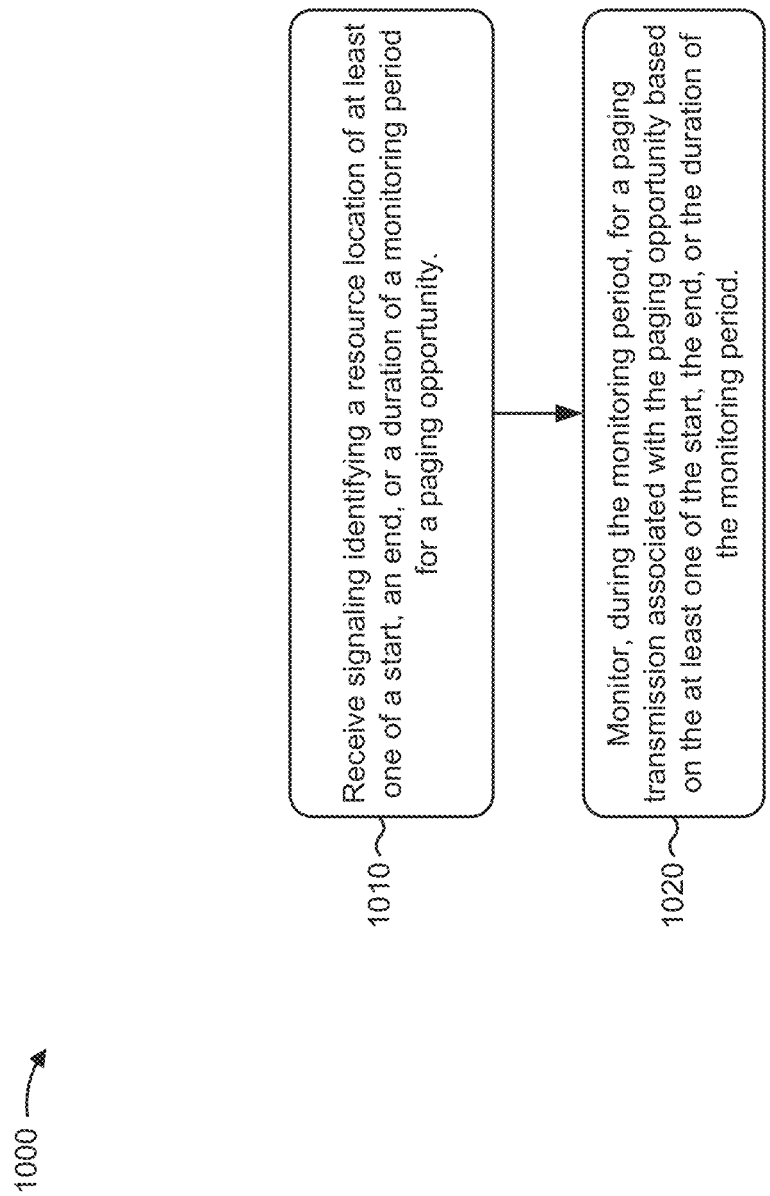
FIG. 10 is a diagram illustrating an example process performed, for example, by a UE.

The stored program codes, when executed by the controller/processor 280 or other processors and modules at the UE 120, may cause the UE 120 to perform operations described with respect to the process 800 of FIG. 8, process 1000 of FIG. 10, or other processes as described herein. A scheduler 246 may schedule UEs for data transmission on the downlink, the uplink, or a combination thereof.

In some aspects, UE 120 may include means for determining a plurality of resource locations associated with a Type-2 PDCCH transmission, and the Type-2 PDCCH is a floating Type-2 PDCCH or a fixed Type-2 PDCCH; means for monitoring the resource location to attempt to receive the Type-2 PDCCH; or combinations thereof. In some aspects, UE 120 may include means for receiving signaling identifying a resource location of at least one of a start or an end of a monitoring period for a paging opportunity, means for monitoring, during the monitoring period, for a paging transmission associated with the paging opportunity based on the at least one of the start or the end of the monitoring period, or combinations thereof. In some aspects, such means may include one or more components of the UE 120 described in connection with FIG. 2.

While blocks in FIG. 2 are illustrated as distinct components, the functions described above with respect to the blocks may be implemented in a single hardware, software, or combination component or in various combinations of components. For example, the functions described with respect to the transmit processor 264, the receive processor 258, the TX MIMO processor 266, or another processor may be performed by or under the control of controller/processor 280.

Figure 3:
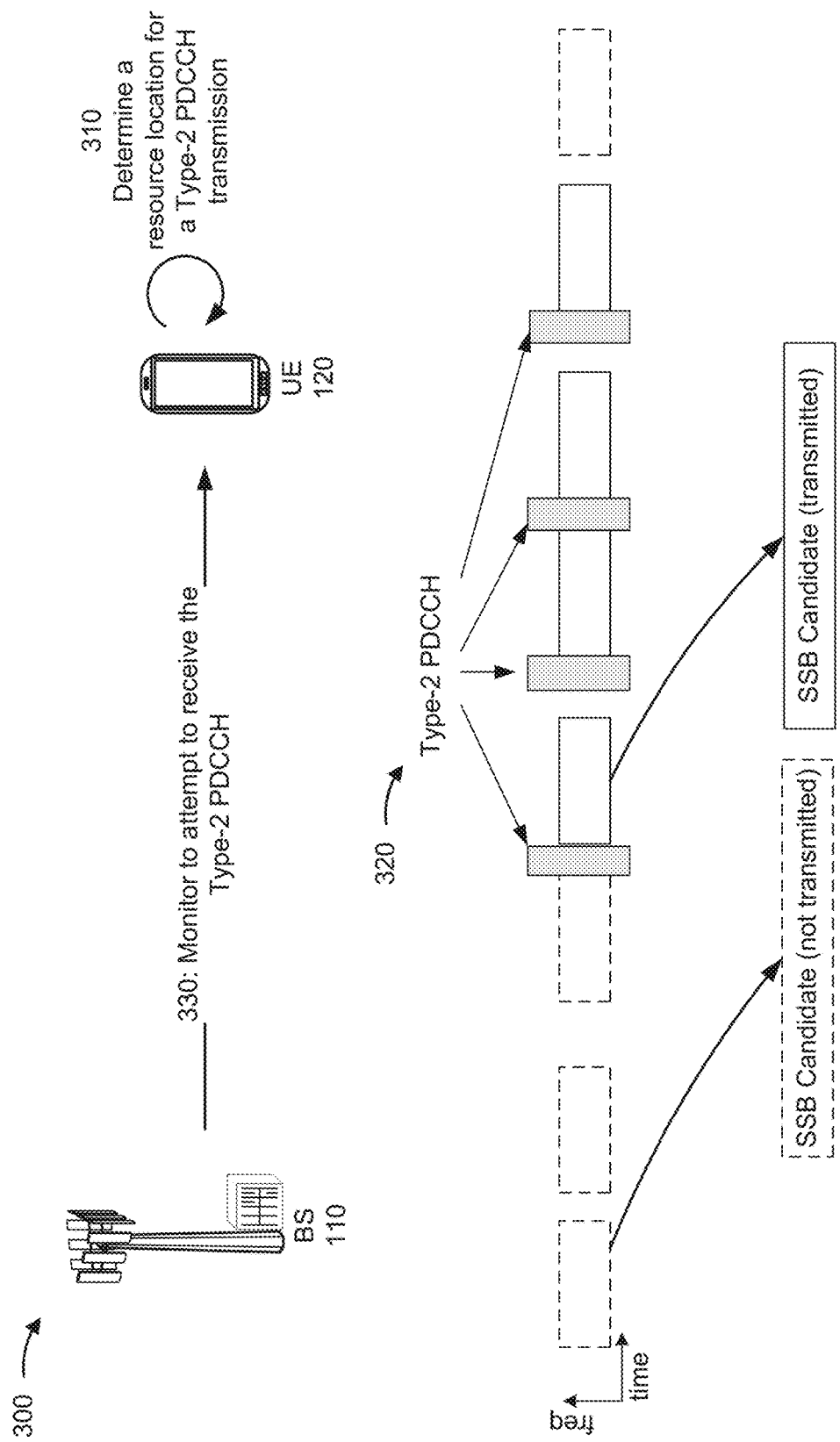
FIGS. 3 and 4 are diagrams illustrating examples of monitoring a floating Type-2 physical downlink control channel (PDCCH).

FIG. 3 is a diagram illustrating an example 300 of monitoring a floating Type-2 PDCCH. As shown in FIG. 3, example 300 may include a BS 110 and a UE 120.

As shown in FIG. 3, and by reference number 310, the UE 120 may determine a resource location for a Type-2 PDCCH transmission. For example, when the UE 120 is to monitor for a floating Type-2 PDCCH, the UE 120 may determine, based at least in part on stored configuration information, that the Type-2 PDCCH is defaulted to a Type-0 PDCCH. In this case, the Type-2 PDCCH may be associated with a same control resource set (CORESET) as the Type-0 PDCCH and may include a paging radio network temporary identifier (P-RNTI) allocation in each Type-2 PDCCH. In some aspects, the UE 120 may determine a stopping condition for ending a monitoring period during which the UE 120 is to monitor for the Type-2 PDCCH. For example, the UE 120 may determine to stop monitoring for the Type-2 PDCCH after a timer expiration, after detection of a Type-0 PDCCH, such as a Type-0 PDCCH that includes an SI-RNTI (system information radio network temporary identifier) scrambling or a Type-2 PDCCH includes a P-RNTI scrambling. In this case, the UE 120 may determine the stopping condition based at least in part on receipt of, for example, a paging DCI and a stop flag aggregated into a single control and/or data message.

A PDCCH candidate location may be classified as floating if at least one parameter (which may include timing) is dependent on detection of a prior signal (e.g. QCL mapping is dependent on a time of a DRS or an SSB with the same QCL). A PDCCH candidate location may be classified as fixed if parameters (which may include timing) can be determined from information already known or configured for the UE. For example, the time of a candidate quasi co-located with a particular SSB can be determined from a cell common (system information block (SIB) or master information block (MIB)) configuration, rather than requiring information of an immediately prior DRS transmission. In floating PDCCH monitoring, the UE 120 may receive triggering information identifying a time or a configuration for monitoring. In fixed PDCCH monitoring, the UE 120 may monitor without having received triggering information identifying the time or the configuration for monitoring when triggered to monitor.

In some aspects, the UE 120 may determine a resource location for monitoring a floating Type-2 PDCCH candidate based at least in part on a quasi-co-location (QCL) relationship between the Type-2 PDCCH and a very recently detected DRS transmission. For example, the Type-2 PDCCH may be associated with a fixed mapping relationship in which the Type-2 PDCCH is associated with a same slot as an SSB transmission. In this case, for a floating Type-2 PDCCH, the floating Type-2 PDCCH may be a triggered floating Type-2 PDCCH when monitoring starts immediately after receiving the DRS transmission. In contrast, a fixed Type-2 PDCCH candidate may be a configured fixed Type-2 PDCCH when monitoring starts on a periodic basis using QCL relationships derived from a past transmission (which may be a downlink reference signal (DRS) or another broadcast or unicast signal). As shown by reference numbers 320 and 330, the BS 110 may transmit, and the UE 120 may monitor to receive the Type-2 PDCCH candidates, which may be time division multiplexed (TDM) with a set of SSB candidates. In some aspects, the BS 110 may forgo transmission of one or more SSB candidates. Even if some SSB candidates are not transmitted in a particular DRS occasion, the UE 120 may still monitor paging candidates based on QCL relationships with the SSB candidates with which the UE 120 is configured from prior transmissions. In some aspects, configured windows may be used for monitoring both fixed and floating Type-2 PDCCH candidates. For monitoring of floating candidates, the UE 120 may receive a start signal to trigger the monitoring.

Figure 4:
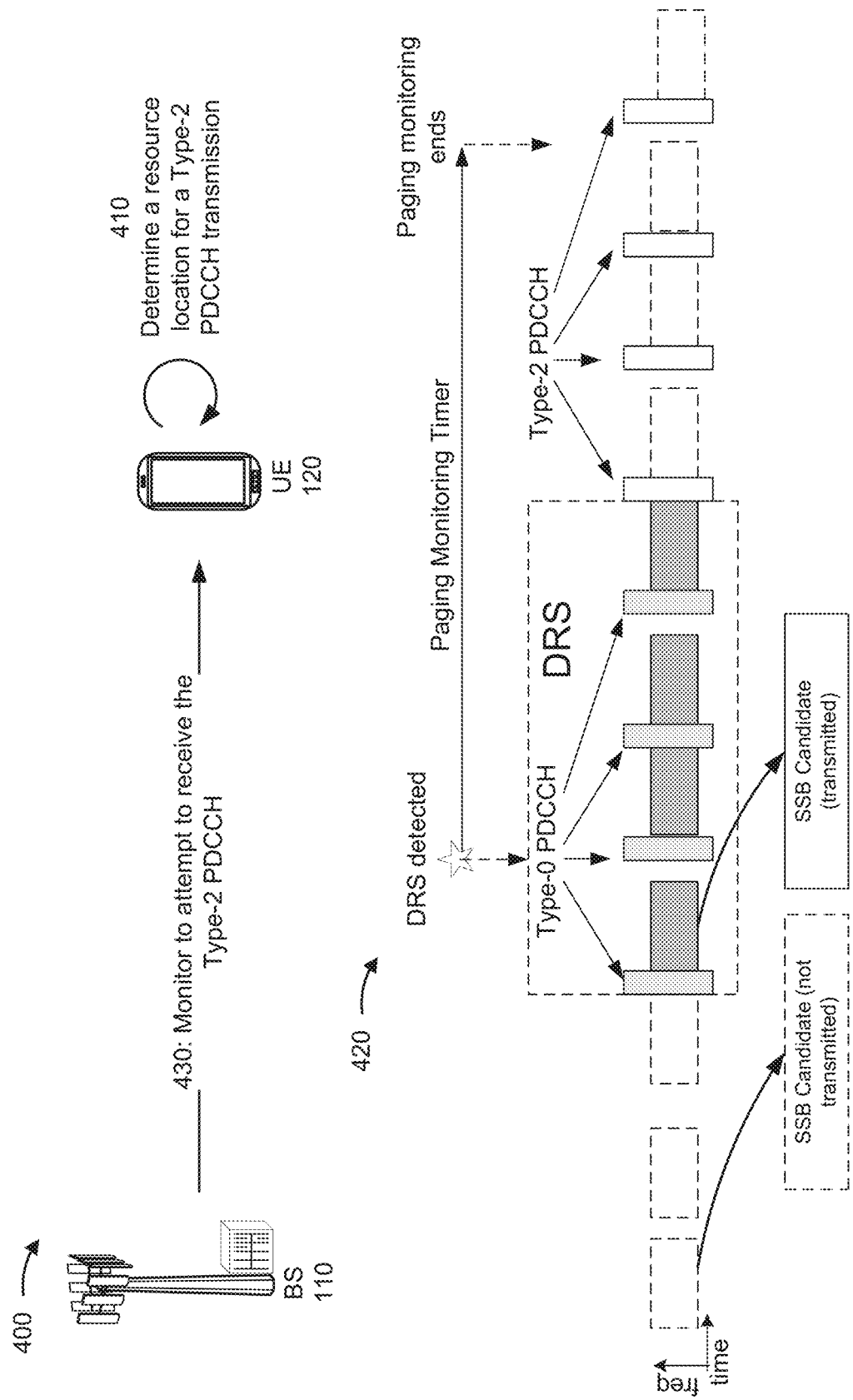

FIG. 4 is a diagram illustrating an example 400 of monitoring a floating Type-2 PDCCH based on DRS triggering. As shown in FIG. 4, the example 400 may include a BS 110 and a UE 120. Although some aspects are described in terms of floating Type-2 PDCCH being based on an immediately prior DRS transmission, other aspects may have fixed Type-2 PDCCH monitoring based on configured monitoring windows, as described above. In each case, Type-2 PDCCH may have a plurality of PDCCH candidates quasi co-located with SSBs, and the UE 120 may monitor in a window (or a plurality of windows), which may repeat.

As shown in FIG. 4, and by reference number 410, the UE 120 may determine a resource location for a Type-2 PDCCH transmission. For example, when the UE 120 is to monitor for a floating Type-2 PDCCH, the UE 120 may determine, based at least in part on stored configuration information, that the Type-2 PDCCH is to occur with or after one or more Type-0 PDCCHs of a DRS transmission period. In this case, the UE 120 may determine that the Type-2 PDCCH is to occur with, or after the DRS transmission period, during the DRS transmission period.

As further shown in FIG. 4, and by reference numbers 420 and 430, the BS 110 may transmit, and the UE 120 may monitor to receive the Type-2 PDCCHs, which may be time division multiplexed (TDM) with a set of SSB candidates. In some aspects, the UE 120 may activate a paging monitoring timer to determine a monitoring period for attempting to receive a Type-2 PDCCH. For example, when a DRS is detected, the UE 120 may trigger a timer countdown, and may attempt to detect the Type-2 PDCCH before expiration of the timer countdown. In some aspects, the BS 110 may transmit a Type-2 PDCCH after a Type-0 PDCCH. Alternatively, the BS 110 may transmit the Type-2 PDCCH without having transmitted the Type-0 PDCCH.

In some aspects, the UE 120 may detect a DRS transmission that triggers a monitoring period for attempting to receive the Type-2 PDCCH based at least in part on detecting another transmission. For example, the UE 120 may detect an SSB transmission, and may detect the DRS transmission based at least in part on detecting the SSB transmission. Additionally, or alternatively, the UE 120 may detect a Type-0 PDCCH transmission and may detect the DRS transmission based at least in part on detecting the Type-0 PDCCH transmission.

In some aspects, the UE 120 may detect the Type-0 PDCCH transmission based at least in part on another parameter. For example, the UE 120 may detect the Type-0 PDCCH transmission based at least in part on a parameter relating to a CORESET demodulation reference signal (DMRS), such as whether a signal to interference noise ratio (SINR) is greater than or equal to 6 decibels (dB). Additionally, or alternatively, the UE 120 may detect the Type-0 PDCCH based at least in part on a remaining minimum system information (RMSI) allocation, such as a system information RNTI (SI-RNTI) or a non-P-RNTI transmission, which the UE 120 may use to validate a system information RNTI (SI-RNTI). Additionally, or alternatively, the UE 120 may detect the Type-0 PDCCH based at least in part on a P-RNTI allocation, which the UE 120 may use to validate a P-RNTI cyclic redundancy check (CRC); a detection of an SSB transmission. Additionally, or alternatively, the UE 120 may detect the Type-0 PDCCH based at least in part on a configured monitoring candidate location, such as based at least in part on a serving DRS measurement timing configuration (DMTC), which the UE 120 may use for cell camping evaluation.

In some aspects, the UE 120 may determine a resource location for receiving a floating Type-2 PDCCH based at least in part on a quasi-co-location (QCL) relationship between the Type-2 PDCCH and a detected DRS transmission. For example, the Type-2 PDCCH may be associated with a fixed mapping relationship in which the Type-2 PDCCH is associated with a fixed time offset or a configured time offset relative to an SSB transmission. Additionally, or alternatively, the UE 120 may monitor a selected subset of QCL locations that are restricted in accordance with a repetition period parameter, an offset parameter, or a monitoring duration parameter and are determined based at least in part on an SSB transmission or with respect to an absolute time value. In this way, by monitoring multiple candidate QCL locations, the UE 120 enables different paging capacities with a floating Type-2 PDCCH and accounts for COT location uncertainty in a shared medium. In some aspects, the UE 120 may monitor all Type-2 PDCCH opportunities, such as those which occur within a monitoring period defined with respect to a paging monitoring timer, thereby improving flexibility of paging configurations. In some cases, the UE 120 may monitor Type-2 PDCCH opportunities without information identifying associated QCL relationships.

In some aspects, the UE 120 may determine, based at least in part on stored information, a set of fixed PO candidates, such as multiple PO candidates in each DRX cycle. In this case, the UE 120 may receive paging signals associated with the set of fixed PO candidates in a different COT or in a same COT as a DRS. For example, the UE 120 may receive paging signals associated with the set of fixed PO candidates in a single continuous COT using a QCL relationship determined based at least in part on an occurrence of a cyclic wraparound. In this case, the UE 120 may be provisioned with one or more POWs in each DRS in which to monitor for the set of fixed PO candidates of the single continuous COT.

Figure 5:
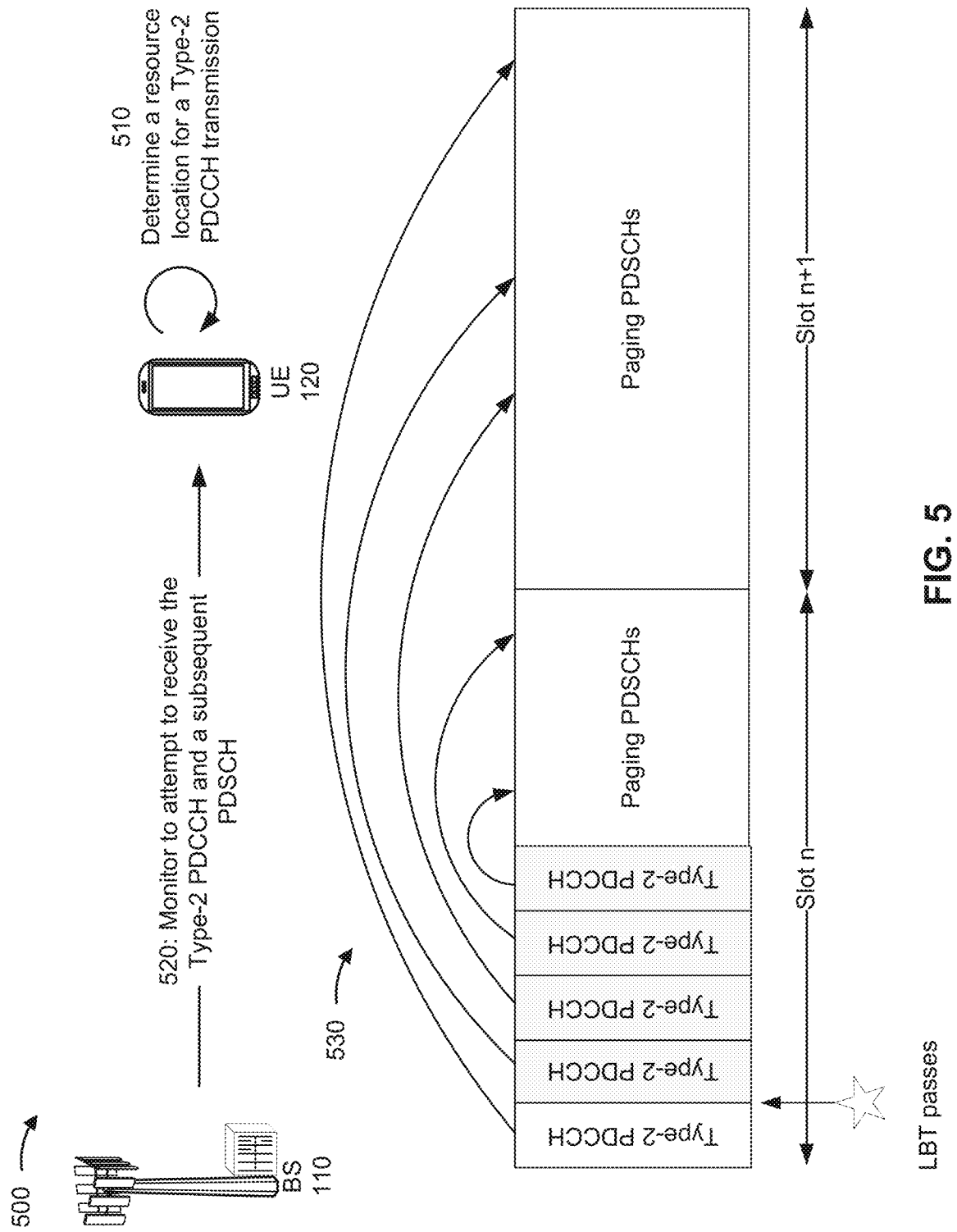
FIGS. 5 and 6 are diagrams illustrating examples of PDCCH candidates in a paging channel occupancy time (COT).

FIG. 5 is a diagram illustrating an example 500 of PDCCH candidates in a paging channel occupancy time (COT). As shown in FIG. 5, example 500 includes a BS 110 and a UE 120.

As further shown in FIG. 5, and by reference number 510, the UE 120 may determine a resource location for a Type-2 PDCCH transmission. For example, when the UE 120 is to monitor for a floating Type-2 PDCCH or a fixed Type-2 PDCCH, the UE 120 may map Type-2 PDCCH CORESETs compactly to a single slot, to a set of contiguous slots, or to a set of disjointed slots within a single COT. In this case, as shown by reference numbers 520 and 530, the BS 110 may transmit, and the UE 120 may monitor to receive the Type-2 PDCCHs and subsequent paging PDSCHs.

In some aspects, a resource allocation for the BS 110 and the UE 120 may lack a set of physical resource blocks in an SSB slot for allocation to a PDSCH that conveys a paging message. In this case, the BS 110 may provide a Type-2 PDCCH DCI with a k0 parameter that points to a subsequent resource allocation in a common COT. For example, the BS 110 may provide RRC signaling to identify an allocation list and a configuration for the subsequent resource allocation for the PDSCH. Additionally, or alternatively, the UE 120 may use a default signaling table, thereby obviating a need for explicit signaling. For example, the default signaling table may include information identifying a set of k0 parameter options for allocations after a DRS. Further, the default signaling table may include information identifying a set of k0 parameter options for satisfying an occupied channel bandwidth (OCB) requirement, a continuity requirement, as described above, or a capacity requirement. In this case, the OCB requirement may relate to having different wideband QCL allocations, such as greater than 16 megahertz (MHz), that are time division multiplexed (TDM), may relate to having different narrowband QCL allocations that are frequency division multiplexed (FDM). In this way, the default signaling table may ensure that the OCB requirement is satisfied.

In some aspects, the UE 120 may be provisioned with a particular start and length indicator value table. For example, UE 120 may use a start and length indicator value table that allows allocations for PDSCHs to occur in a reverse order of Type-2 PDCCH occurrence. For example, as shown, a first Type-2 PDCCH, occurring before a listen-before-talk (LBT) occasion is complete, may correspond to a last paging PDSCH occasion. Similarly, a second Type-2 PDCCH may correspond to a second to last paging PDSCH occasion, and so on. In some aspects, when a CORESET fails for the LBT occasion, the BS 110 may drop corresponding PDSCHs of the LBT occasion.

In some aspects, the UE 120 may receive a P-RNTI scrambling, which indicates that additional P-RNTI allocations are to be expected. In some aspects, an indication may be transmitted in a control channel, such as via a Type-2 PDCCH, in a payload channel, such as via a PDSCH allocated by a Type-2 PDCCH message. In some aspects, the indication may include an indication of a location of an additional subsequent allocation that is to occur or may indicate to the UE 120 to select a subsequent P-RNTI allocation opportunity based at least in part on stored or internal configuration. In this case, such indications may inform the UE 120 of QCL relationships between Type-2 PDCCH candidates to monitor.

In some aspects, the UE 120 may be configured to ignore a subset of future Type-2 PDCCH candidate occasions in the monitoring window, when detecting the successful reception of a current Type-2 PDCCH candidate. In this case, the UE 120 may still continue monitoring subsequent Type-2 PDCCH candidates that satisfy one or more configured criteria, such as not being subject to a known PDSCH allocation or being subject to acquired information to expect the reception of subsequent Type-2 PDCCH candidate.

Figure 6:
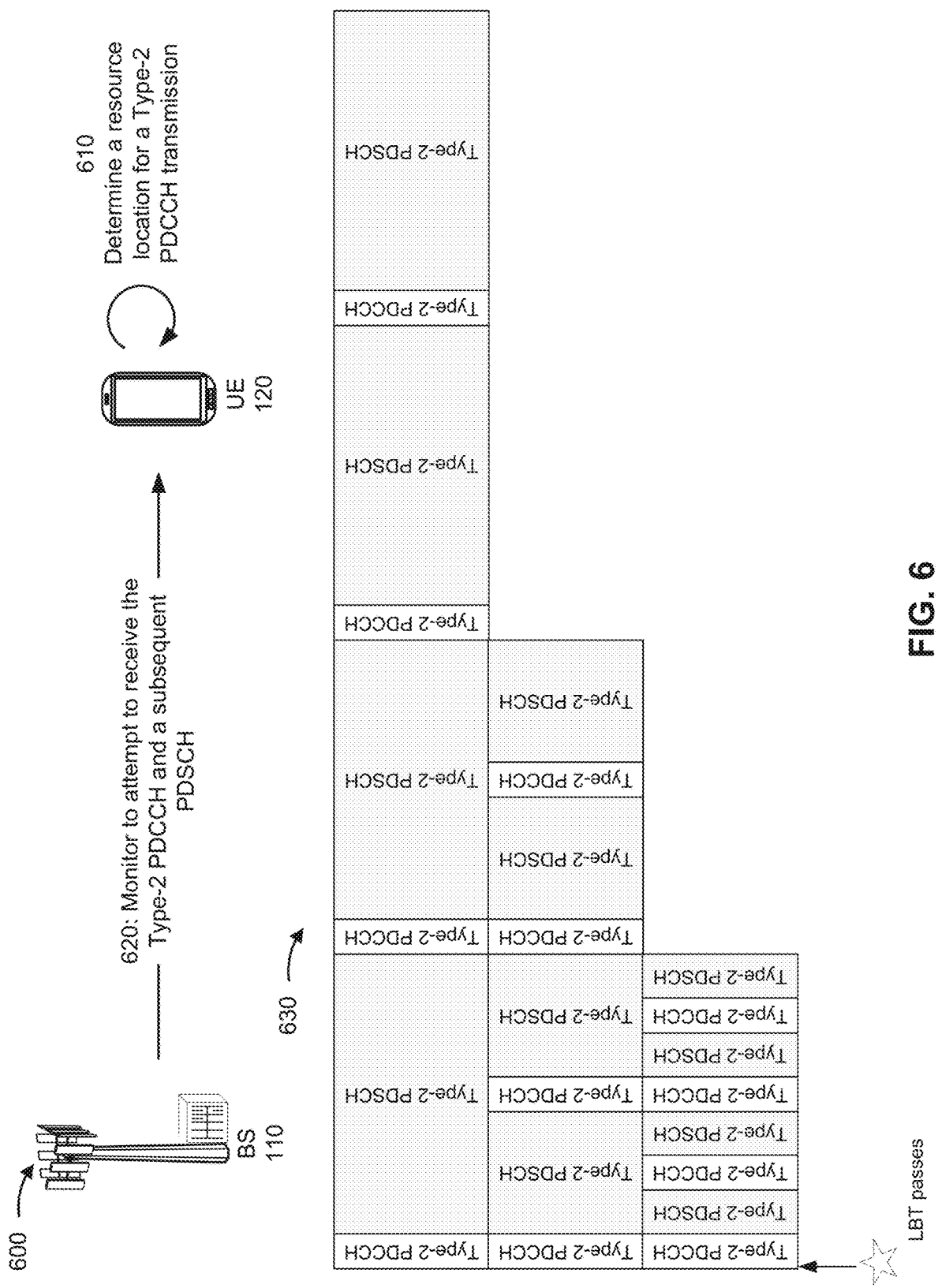

FIG. 6 is a diagram illustrating an example 600 of PDCCH candidates in a paging COT. As shown in FIG. 6, the example 600 may include a BS 110 and a UE 120.

As further shown in FIG. 6, and by reference number 610, the UE 120 may determine a resource location for a Type-2 PDCCH transmission associated with a telescoping Type-2 CORESET map. In this case, the BS 110 may select a map, of a set of candidate maps, based at least in part on a compactness criterion for a paging COT. For example, when the UE 120 is to monitor for a floating Type-2 PDCCH or a fixed Type-2 PDCCH, the BS 110 may map Type-2 PDCCH CORESETs compactly to a subsequent Type-2 PDSCH. In this case, as shown by reference numbers 620 and 630, the BS 110 may transmit, and the UE 120 may monitor to receive the Type-2 PDCCHs and subsequent Type-2 PDSCHs.

In some aspects, the BS 110 may transmit Type-2 PDCCH candidates in a paging COT based at least in part on a paging capacity criterion for the paging COT and to satisfy a continuity constraint for the paging COT. In this case, the UE 120 may lack QCL relationship-based information identifying which Type-2 PDCCH occasion the BS 110 will use for transmission. As a result, in some aspects, the UE 120 may monitor all possible Type-2 PDCCH occasions to receive the Type-2 PDCCH candidates from the BS 110.

Figure 7:
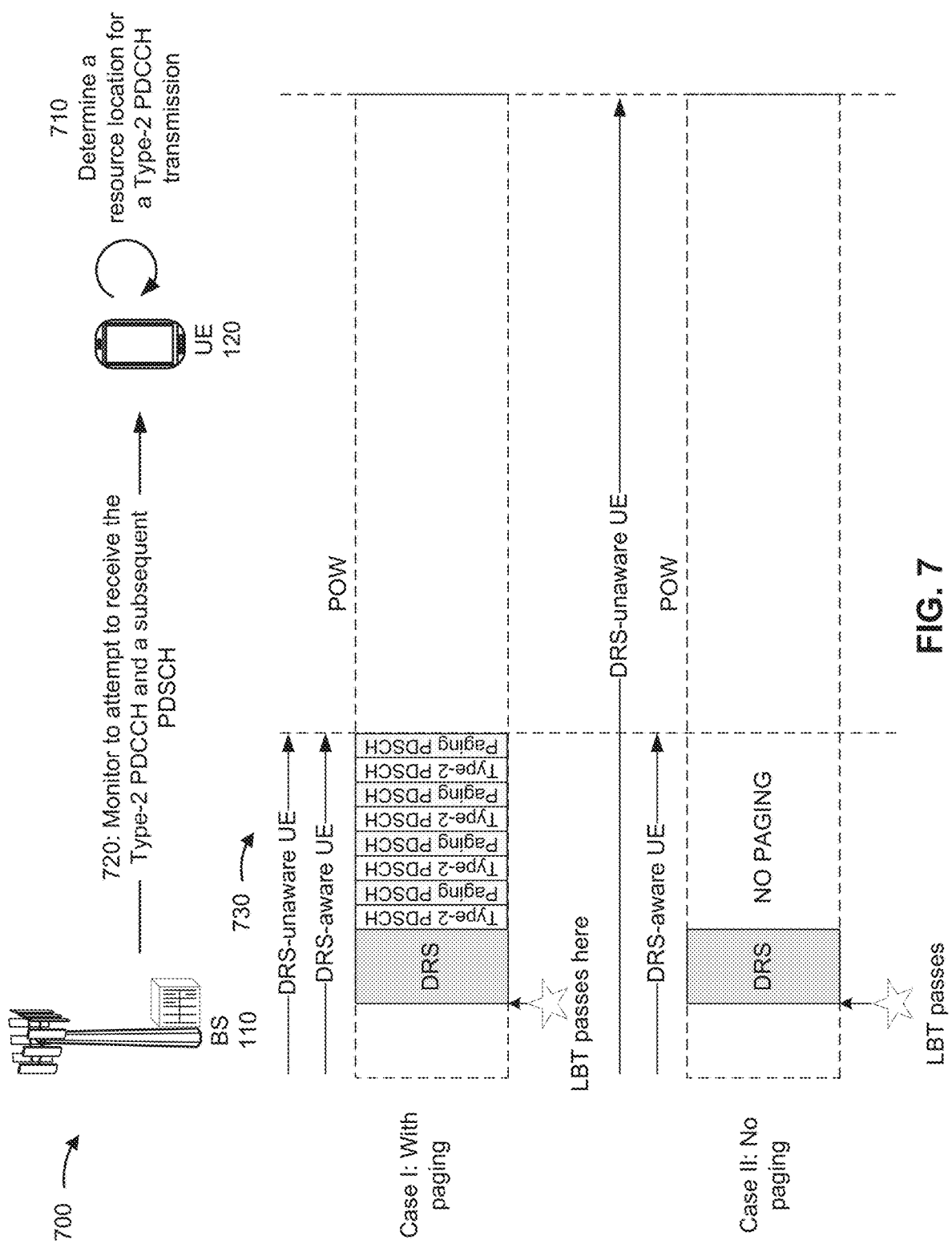
FIG. 7 is a diagram illustrating an example of monitoring both a floating Type-2 PDCCH and a fixed Type-2 PDCCH.

FIG. 7 is a diagram illustrating an example 700 of monitoring both a floating Type-2 PDCCH and a fixed Type-2 PDCCH. As shown in FIG. 7, the example 700 includes a BS 110 and a UE 120.

As further shown in FIG. 7, and by reference number 710, the UE 120 may determine a resource location for a Type-2 PDCCH transmission. In this case, the UE 120 may be configured to detect the Type-2 PDCCH without having detected a DRS. In some aspects, the UE 120 may determine to monitor for a Type-2 PDCCH after a DRS is detected in accordance with an early termination timer. Additionally, or alternatively, the UE 120 may determine to monitor for the Type-2 PDCCH during an entirety of a POW. As shown by reference numbers 620 and 630, the BS 110 may transmit, and the UE 120 may monitor to receive the Type-2 PDCCHs and subsequent Type-2 PDSCHs.

In some aspects, as shown in Case I, when a paging PDSCH is received after a DRS, the UE 120 may monitor for a particular period of time after the DRS to receive Type-2 PDCCHs. In this case, the UE 120 may terminate monitoring at the end of an early termination timer in both a first sub-scenario (i.e., where the UE 120 does not condition monitoring on detecting a DRS), which may be termed DRS-unaware, and in a second sub-scenario (i.e., where the UE 120 does condition monitoring on detecting a DRS), which may be termed DRS-aware. In some aspects, the UE 120 may enable an early termination timer immediately after a paging DCI is detected to enable termination of monitoring at the end of the early termination timer.

In contrast, as shown in Case II, when no paging is received after a DRS, a DRS-aware UE 120 may terminate at expiration of the early termination timer, but a DRS-unaware UE 120 may not terminate until an end of a POW. In this way, the UE 120 may be provisioned to accommodate multiple different use cases. In some aspects, the BS 110 may signal an absence of paging using a DRS, and the UE 120 may terminate monitoring for paging based at least in part on receiving the DRS, thereby saving power relative to waiting until expiration of an early termination timer to terminate monitoring for paging.

In some aspects, such as when the UE 120 is provisioned with multiple paging configurations, the UE 120 may determine one of the multiple paging configurations to use for determining a monitoring period for detecting a Type-2 PDCCH, or a subsequent PDSCH. For example, the UE 120 may be configured with a DRS-conditional POW, a limited start and length indicator flexibility paging configuration, a high periodicity paging configuration, or a low-capacity paging configuration. In this case, the low-capacity paging configuration may enable less than a threshold, such as less than three, international mobile subscriber identity (IMSI) identities in the paging message. Additionally, or alternatively, the UE 120 may be configured with a high-capacity paging configuration that enables greater than or equal to a threshold quantity of, for example, IMSI messages. In some aspects, the UE 120 may switch from the low-capacity paging configuration to the high-capacity paging configuration, as described herein. For example, the UE 120 may switch between the multiple paging configurations based at least in part on a radio resource control (RRC) paging message, an RRC information element (IE) message, a DCI flag of a P-RNTI, a DCI flag of an SI-RNTI, or a flag of a physical broadcast channel (PBCH). In this case, the UE 120 may fall back from the high-capacity paging configuration to the low-capacity paging configuration based at least in part on expiration of a timer, receipt of a triggering message, such as an RRC message or a DCI flag.

FIG. 8 is a diagram illustrating an example process 800 performed, for example, by a UE, in accordance with various aspects of the present disclosure. Example process 800 is an example where a UE, such as the UE 120, performs operations associated with Type-2 PDCCH monitoring.

As shown in FIG. 8, in some aspects, process 800 may include determining a plurality of resource locations associated with a Type-2 PDCCH transmission and the Type-2 PDCCH is a floating Type-2 PDCCH or a fixed Type-2 PDCCH (block 810). For example, the UE (using receive processor 258, transmit processor 264, controller/processor 280, or memory 282) may determine a plurality of resource locations associated with a Type-2 PDCCH transmission and the Type-2 PDCCH is a floating Type-2 PDCCH or a fixed Type-2 PDCCH, as described above. In some aspects, the Type-2 PDCCH is a floating Type-2 PDCCH or a fixed Type-2 PDCCH.

As further shown in FIG. 8, in some aspects, process 800 may include monitoring the plurality of resource locations to attempt to receive the Type-2 PDCCH (block 820). For example, the UE (using receive processor 258, transmit processor 264, controller/processor 280, or memory 282) may monitor the plurality of resource locations to attempt to receive the Type-2 PDCCH, as described above.

Process 800 may include additional aspects, such as any single implementation or any combination of aspects described below or in connection with one or more other processes described elsewhere herein.

In a first aspect, a configuration of the Type-2 PDCCH defaults to a configuration of a Type-0 PDCCH. In a second aspect, alone or in combination with the first aspect, the Type-2 PDCCH is associated with a common core resource set with a Type-0 PDCCH. In a third aspect, alone or in combination with one or more of the first and second aspects, a monitoring period for the monitoring is defined based at least in part on at least one of: a timer expiration for the Type-2 PDCCH, a detection of one or more Type-0 PDCCH CORESETs without a P-RNTI, or a detection of a Type-2 PDCCH CORESET with a P-RNTI.

In a fourth aspect, alone or in combination with one or more of the first through third aspects, the Type-2 PDCCH occurs during or after a DRS transmission period. In a fifth aspect, alone or in combination with one or more of the first through fourth aspects, the UE is configured to trigger a paging monitoring timer associated with a monitoring period for the monitoring based at least in part on detection of a DRS transmission. In a sixth aspect, alone or in combination with one or more of the first through fifth aspects, the UE is configured to detect the DRS transmission based at least in part on at least one of a synchronization signal block detection, a Type-0 PDCCH detection, or a Type-2 PDCCH detection.

In a seventh aspect, alone or in combination with one or more of the first through sixth aspects, a monitoring period for the monitoring is defined with respect to a Type-0 PDCCH transmission that is detectable based at least in part on at least one of a CORESET DMRS parameter, a RMSI allocation parameter, or a SSB detection parameter.

In an eighth aspect, alone or in combination with one or more of the first through seventh aspects, a monitoring period for the monitoring is defined with respect to a Type-2 PDCCH transmission that is detectable based at least in part on at least one of a CORESET DMRS parameter, a P-RNTI allocation parameter, or, a SSB detection parameter.

In a ninth aspect, alone or in combination with one or more of the first through eighth aspects, the monitoring includes monitoring for the Type-2 PDCCH based at least in part on a QCL relationship for the Type-2 PDCCH. In a tenth aspect, alone or in combination with one or more of the first through ninth aspects, the plurality of resource locations associated with the Type-2 PDCCH is associated with a fixed mapping QCL relationship. In an eleventh aspect, alone or in combination with one or more of the first through tenth aspects, the Type-2 PDCCH is associated with a same slot as a SSB or is offset from the SSB by a particular period of time. In a twelfth aspect, alone or in combination with one or more of the first through eleventh aspects, the particular period of time is defined based at least in part on a stored period or a configured period.

In a thirteenth aspect, alone or in combination with one or more of the first through twelfth aspects, the plurality of resource locations of the Type-2 PDCCH is associated with a particular set of candidate QCL locations. In a fourteenth aspect, alone or in combination with one or more of the first through thirteenth aspects, the particular set of candidate QCL locations are restricted based at least in part on at least one of a repetition period, an offset value, or a monitoring duration with respect to a detected synchronization signal block or a time value derived from a system timing.

In a fifteenth aspect, alone or in combination with one or more of the first through fourteenth aspects, the plurality of resource locations of the Type-2 PDCCH is associated with a QCL location at each Type-2 PDCCH opportunity within a monitoring window associated with a monitoring period for the monitoring. In a sixteenth aspect, alone or in combination with one or more of the first through fifteenth aspects, a DCI of the Type-2 PDCCH indicates a k0 parameter value identifying a subsequent allocation for a PDSCH carrying a paging message. In a seventeenth aspect, alone or in combination with one or more of the first through sixteenth aspects, a Type-2 PDSCH is associated with a k0 parameter table identifying a set of k0 parameters for allocations after a DRS that satisfy at least one of an OCB requirement, a continuity requirement, or a capacity requirement.

In an eighteenth aspect, alone or in combination with one or more of the first through seventeenth aspects, the OCB requirement is at least one of a requirement for different wideband QCL allocations that are TDM or a requirement for different narrowband WCL allocations that are FDM. In a nineteenth aspect, alone or in combination with one or more of the first through eighteenth aspects, a monitoring period for the monitoring is associated with multiple POWs in each DRS transmission period.

In a twentieth aspect, alone or in combination with one or more of the first through nineteenth aspects, multiple of Type-2 PDCCH CORESET candidates are mapped within a single COT. In a twenty-first aspect, alone or in combination with one or more of the first through twentieth aspects, each of multiple Type-2 PDSCH allocations for paging occupies symbols between two successive Type-2 PDCCH CORESET candidates. In a twenty-second aspect, alone or in combination with one or more of the first through twenty-first aspects, a DCI message in the Type-2 PDCCH or a Type-2 PDCCH allocation includes an indicator of whether additional Type-2 PDCCH allocations with a same QCL parameter are to be provided and a location of the additional Type-2 PDCCH allocations.

In a twenty-third aspect, alone or in combination with one or more of the first through twenty-second aspects, the Type-2 PDCCH is associated with a telescoping Type-2 PDCCH CORESET map and a mapping is selected for COT paging compactness. In a twenty-fourth aspect, alone or in combination with one or more of the first through twenty-third aspects, a telescoping Type-2 PDCCH CORESET map refers to a set of Type-2 PDCCH CORESET candidates with a same QCL parameter. In a twenty-fifth aspect, alone or in combination with one or more of the first through twenty-fourth aspects, a monitoring period for the monitoring is determined based at least in part on a paging COT continuity constraint associated with a paging capacity requirement. In a twenty-sixth aspect, alone or in combination with one or more of the first through twenty-fifth aspects, a monitoring period for the monitoring is defined based at least in part on an early termination timer. In a twenty-seventh aspect, alone or in combination with one or more of the first through twenty-sixth aspects, the UE is configured to stop monitoring QCL Type-2 PDCCH candidates when a termination timer has expired and after a signal associated with DRS. In a twenty-eighth aspect, alone or in combination with one or more of the first through twenty-seventh aspects, the monitoring includes detecting the Type-2 PDCCH without (or regardless of) having detected a DRS.

In a twenty-ninth aspect, alone or in combination with one or more of the first through twenty-eighth aspects, the monitoring includes monitoring for the Type-2 PDCCH after a downlink reference signal is detected. In a thirty aspect, alone or in combination with one or more of the first through twenty-ninth aspects, the UE may end the monitoring for the Type-2 PDCCH based at least in part on not detecting paging before an expiration of an early termination timer or before an expiration of a paging monitoring window. In a thirty-first aspect, alone or in combination with one or more of the first through thirty aspects, the UE may determine a paging configuration. In a thirty-second aspect, alone or in combination with one or more of the first through thirty-first aspects, the UE may monitor based at least in part on the paging configuration.

In a thirty-third aspect, alone or in combination with one or more of the first through thirty-second aspects, the paging configuration is at least one of a DRS-conditional POW with a set of possible start and length indicator values, a DRS-conditional POW with a threshold periodicity, a paging window with a set of possible IMSI messages, a low-capacity paging configuration, or, a high-capacity paging configuration. In a thirty-fourth aspect, alone or in combination with one or more of the first through thirty-third aspects, determining the paging configuration includes determining the paging configuration based at least in part on at least one of a RRC paging message, an RRC IE, a DCI flag associated with a paging RNTI, a DCI flag associated with a SI-RNTI, or a PBCH flag. In a thirty-fifth aspect, alone or in combination with one or more of the first through thirty-fourth aspects, determining the paging configuration includes switching from a high-capacity paging configuration to a low-capacity paging configuration based at least in part on at least one of a timer expiration or a triggering message. In a thirty-sixth aspect, alone or in combination with one or more of the first through thirty-fifth aspects, the plurality of resource locations map to a single quasi-co-location parameter. In a thirty-seventh aspect, alone or in combination with one or more of the first through thirty-sixth aspects, an indicator identifies a selection of a location of an additional Type-2 PDCCH allocation of a set of pre-configured locations for monitoring for additional type-2 PDCCH allocations.

Although FIG. 8 shows example blocks of process 800, in some aspects, process 800 may include additional blocks, fewer blocks, different blocks, or differently arranged blocks than those depicted in FIG. 8. Additionally, or alternatively, two or more of the blocks of process 800 may be performed in parallel.

Figure 9:
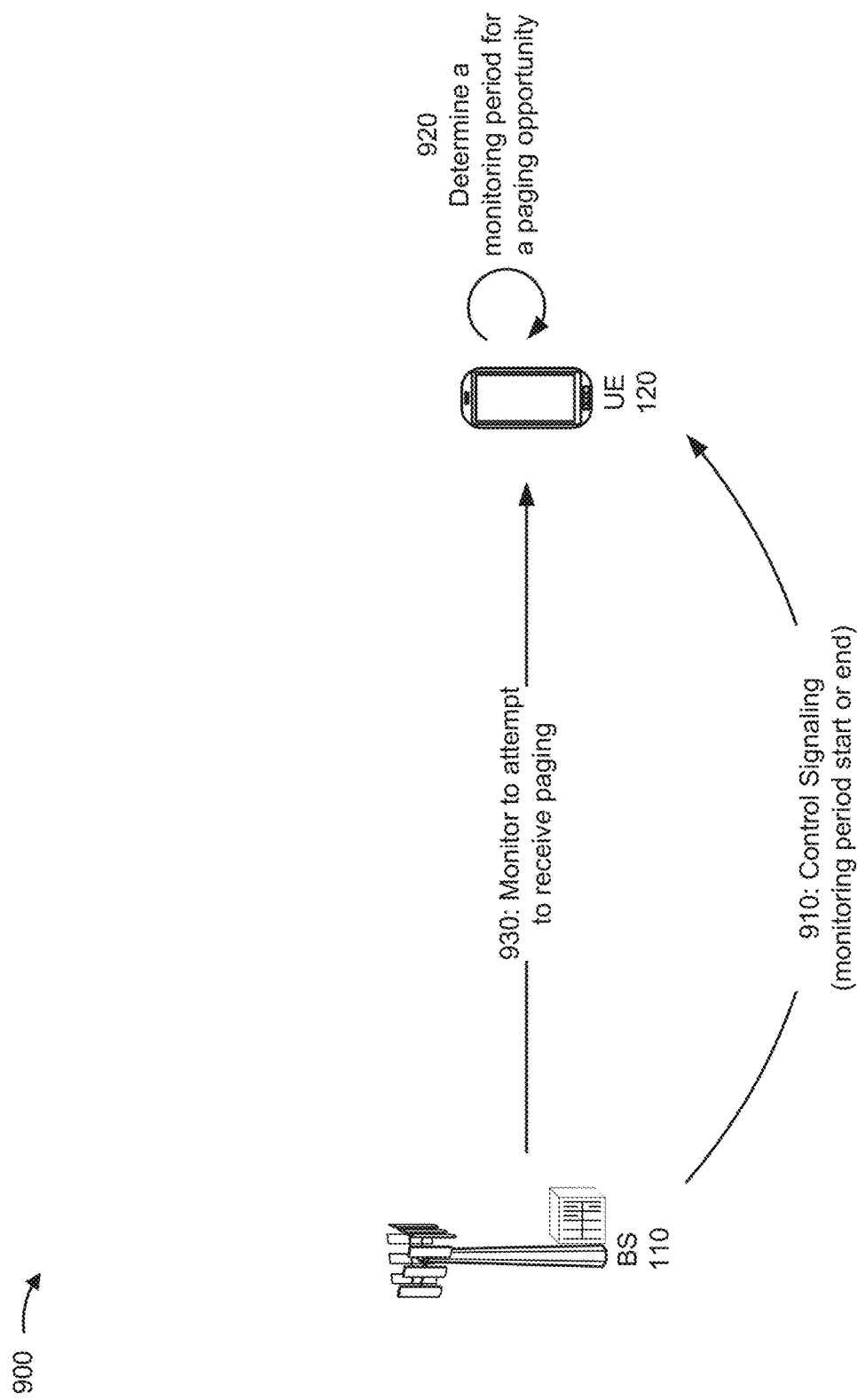
FIG. 9 is a diagram illustrating an example of paging opportunity monitoring.

FIG. 9 is a diagram illustrating an example 900 of paging occasion monitoring. As shown in FIG. 9, the example 900 includes a BS 110 and a UE 120.

As shown in FIG. 9, and by reference number 910, the UE 120 may receive control signaling from the BS 110. For example, the UE 120 may receive control signaling identifying a resource location, such as a start of a monitoring period for a paging occasion or an end to a monitoring period for a paging occasion. In this case, the UE 120 may lack a priori information identifying the start of the monitoring period or the end of the monitoring period before receiving the control signaling, or may be configured with a different start of the monitoring period or end of the monitoring period. In some aspects, the monitoring period may be a single continuous interval. In some aspects, the monitoring period may be multiple disjoint, or disjointed, intervals.

In some aspects, the control signaling may indicate a resource location for a paging opportunity start or a DRS monitoring window start. In some aspects, the UE 120 may receive control signaling identifying a start of a monitoring period, an end of a monitoring period, or a criterion for altering the monitoring period. In some implementations, the UE 120 may receive control signaling identifying the end of the monitoring period during the monitoring period itself.

In some aspects, the UE 120 may be triggered to start the monitoring period based on receiving a SI-RNTI scrambled DCI, a P-RNTI DCI, or another type of RNTI-scrambled DCI. Additionally, or alternatively, the UE 120 may be triggered to start the monitoring period based on receiving control signaling indicating a start of a COT or another type of physical signal.

In some aspects, the UE 120 may parse the control signaling to determine the monitoring period. For example, the UE 120 may determine that a lower layer signal, such as a DCI, includes a flag indicating that a paging message is to occur at a subsequent time or that a paging message is not to occur at a subsequent time. Additionally, or alternatively, the UE 120 may determine that a bitmap in the control signaling indicates that the control signaling applies to the UE 120 or one or more other UEs. Additionally, or alternatively, the UE 120 may determine a k0 parameter or a periodicity based on the control signaling.

In some aspects, the UE 120 may parse a payload of the control signaling to determine a monitoring period. For example, the UE 120 may receive RRC paging, a SIB message, or a paging message including an indicator of whether paging messages are to occur during a monitoring period. In some aspects, the UE 120 may receive a paging message and may determine not to monitor for subsequent paging during a threshold period of time. Alternatively, the UE 120 may receive the paging message or a P-RNTI DCI and may determine that an allocation for paging is to be received at a subsequent time.

As further shown in FIG. 9, and by reference number 920, the UE 120 may determine a monitoring period for a paging opportunity. For example, the UE 120 may determine to start a monitoring period to monitor for paging at a current time or at a subsequent time based on the control signaling. Additionally, or alternatively, the UE 120 may determine to end a currently ongoing monitoring period at a current time or at a subsequent time based on the control signaling. In some aspects, the UE 120 may determine to continue monitoring until a stopping criterion is detected, such as an SI-RNTI based DCI detection occurring.

As further shown in FIG. 9, and by reference number 930, the UE 120 may monitor during the monitoring period to attempt to receive the paging. For example, the UE 120 may monitor for paging during a particular period of time and may end monitoring for paging at a particular period of time determined based on the monitoring period. As an example, the UE 120 may receive an SI-RNTI DCI indicating that new paging is not to occur and may stop the monitoring period before a configured end to the monitoring period. As another example, the UE 120 may end the monitoring period after receiving a P-RNTI during the monitoring period that includes paging and an indication that further paging is not to occur. As another example, the UE 120 may end the monitoring period after detecting a CORESET type 0 in connection with an SI-RNTI DCI but not detecting a P-RNTI DCI.

FIG. 10 is a diagram illustrating an example process 1000 performed, for example, by a UE, in accordance with various aspects of the present disclosure. The example process 1000 shows where a UE, such as the UE 120, performs operations associated with paging opportunity monitoring.

As shown in FIG. 10, in some aspects, process 1000 may include receiving signaling identifying a resource location of at least one of a start, an end, or a duration of a monitoring period for a paging opportunity (block 1010). For example, the UE (using receive processor 258, transmit processor 264, controller/processor 280, or memory 282) may receive signaling identifying a resource location of at least one of a start, an end, or a duration of a monitoring period for a paging opportunity. In some aspects, the UE may include a first interface for receiving the signaling.

As shown in FIG. 10, in some aspects, process 1000 may include monitoring, during the monitoring period, for a paging transmission associated with the paging opportunity based on the at least one of the start or the end of the monitoring period (block 1020). For example, the UE (using receive processor 258, transmit processor 264, controller/processor 280, memory 282) may monitor, during the monitoring period, for a paging transmission associated with the paging opportunity based on the at least one of the start or the end of the monitoring period. In some aspects, the UE may include a second interface for monitoring for the paging transmission.

The process 1000 may include additional aspects, such as any single implementation or any combination of aspects described below and/or in connection with one or more other processes described elsewhere herein.

In a first aspect, the paging transmission is associated with a PDCCH.

In a second aspect, alone or in combination with the first aspect, the resource location is at least one of a starting resource location for the monitoring period or a stopping resource location for the monitoring period.

In a third aspect, alone or in combination with any one or more of the first and second aspects, the signaling is at least one of a system information radio network temporary identifier (SI-RNTI)-scrambling of a downlink control information (DCI), a paging radio network temporary identifier (P-RNTI)-scrambling of a DCI, a DCI, a DCI explicitly carrying the signaling, a DCI implicitly indicating the signaling, a channel occupancy time start signal, or a channel occupancy time end signal.

In a fourth aspect, alone or in combination with any one or more of the first through third aspects, the signaling includes at least one of a flag identifying whether paging is to be further monitored in the monitoring period, a bitmap indicating a set of UEs to which the signaling applies, a change to a DCI configuration, a starting time for monitoring for a paging DCI, a resource indication for monitoring for a paging DCI, a periodicity identifier for the paging transmission, a payload message, a paging message, or a SI-RNTI scrambling.

In a fifth aspect, alone or in combination with any one or more of the first through fourth aspects, the process 1000 may include receiving further signaling during monitoring of the monitoring period and selectively monitoring in accordance with the further signaling.

In a sixth aspect, alone or in combination with any one or more of the first through fifth aspects, selectively monitoring in accordance with the further signaling includes continuing to monitor based on the signaling indicating that further paging is to be transmitted.

In a seventh aspect, alone or in combination with any one or more of the first through sixth aspects, the further signaling is at least one of a SI-RNTI-scrambled DCI, a P-RNTI-scrambled DCI, a DCI, a physical signal, or a monitored signal.

In an eighth aspect, alone or in combination with any one or more of the first through seventh aspects, the monitoring period may be a single contiguous interval.

In a ninth aspect, alone or in combination with any one or more of the first through eighth aspects, the monitoring period may be a plurality of disjointed intervals.

In a tenth aspect, alone or in combination with any one or more of the first through ninth aspects, receiving the signaling includes receiving signaling during the monitoring period.

In an eleventh aspect, alone or in combination with any one or more of the first through tenth aspects, process 1000 includes determining, based at least in part on the signaling identifying the resource location of the end of the monitoring period, that the paging reception is not to occur at a time subsequent to receiving the signaling; and monitoring, during the monitoring period, for the paging transmission includes ending the monitoring period.

In a twelfth aspect, alone or in combination with any one or more of the first through eleventh aspects, selectively monitoring in accordance with the further signaling includes ending monitoring based on the signaling indicating that further paging is not to be monitored.

In a thirteenth aspect, alone or in combination with any one or more of the first through twelfth aspects, the monitoring period is a single interval.

Although FIG. 10 shows example blocks of the process 1000, in some aspects, the process 1000 may include additional blocks, fewer blocks, different blocks, or differently arranged blocks than those depicted in FIG. 10. Additionally, or alternatively, two or more of the blocks of the process 1000 may be performed in parallel.

The foregoing disclosure provides illustration and description, but is not intended to be exhaustive or to limit the aspects to the precise form disclosed. Modifications and variations may be made in light of the above disclosure or may be acquired from practice of the aspects.

As used herein, the term "component" is intended to be broadly construed as hardware, firmware, or a combination of hardware and software. As used herein, a processor is implemented in hardware, firmware, or a combination of hardware and software.

As used herein, satisfying a threshold may, depending on the context, refer to a value being greater than the threshold, greater than or equal to the threshold, less than the threshold, less than or equal to the threshold, equal to the threshold, or not equal to the threshold.

As used herein, a phrase referring to "at least one of" a list of items refers to any combination of those items, including single members. As an example, "at least one of: a, b, or c" is intended to cover: a, b, c, a-b, a-c, b-c, and a-b-c.

The various illustrative logics, logical blocks, modules, circuits and algorithm processes described in connection with the aspects disclosed herein may be implemented as electronic hardware, computer software, or combinations of both. The interchangeability of hardware and software has been described generally, in terms of functionality, and illustrated in the various illustrative components, blocks, modules, circuits and processes described above. Whether such functionality is implemented in hardware or software depends upon the particular application and design constraints imposed on the overall system.

The hardware and data processing apparatus used to implement the various illustrative logics, logical blocks, modules and circuits described in connection with the aspects disclosed herein may be implemented or performed with a general purpose single- or multi-chip processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general purpose processor may be a microprocessor, or, any conventional processor, controller, microcontroller, or state machine. A processor also may be implemented as a combination of computing devices, for example, a combination of a DSP and a microprocessor, multiple microprocessors, one or more microprocessors in conjunction with a DSP core, or any other such configuration. In some aspects, particular processes and methods may be performed by circuitry that is specific to a given function.

In one or more aspects, the functions described may be implemented in hardware, digital electronic circuitry, computer software, firmware, including the structures disclosed in this specification and their structural equivalents thereof, or in any combination thereof. Aspects of the subject matter described in this specification also can be implemented as one or more computer programs, i.e., one or more modules of computer program instructions, encoded on a computer storage media for execution by, or to control the operation of, data processing apparatus.

If implemented in software, the functions may be stored on or transmitted over as one or more instructions or code on a computer-readable medium. The processes of a method or algorithm disclosed herein may be implemented in a processor-executable software module which may reside on a computer-readable medium. Computer-readable media includes both computer storage media and communication media including any medium that can be enabled to transfer a computer program from one place to another. A storage media may be any available media that may be accessed by a computer. By way of example, and not limitation, such computer-readable media may include RAM, ROM, EEPROM, CD-ROM or other optical disk storage, magnetic disk storage or other magnetic storage devices, or any other medium that may be used to store desired program code in the form of instructions or data structures and that may be accessed by a computer. Also, any connection can be properly termed a computer-readable medium. Disk and disc, as used herein, includes compact disc (CD), laser disc, optical disc, digital versatile disc (DVD), floppy disk, and Blu-ray disc where disks usually reproduce data magnetically, while discs reproduce data optically with lasers. Combinations of the above may also be included within the scope of computer-readable media. Additionally, the operations of a method or algorithm may reside as one or any combination or set of codes and instructions on a machine readable medium and computer-readable medium, which may be incorporated into a computer program product.

Various modifications to the aspects described in this disclosure may be readily apparent to those skilled in the art, and the generic principles defined herein may be applied to other aspects without departing from the spirit or scope of this disclosure. Thus, the claims are not intended to be limited to the aspects shown herein, but are to be accorded the widest scope consistent with this disclosure, the principles and the novel features disclosed herein.

Additionally, a person having ordinary skill in the art will readily appreciate, the terms "upper" and "lower" are sometimes used for ease of describing the Figures, and indicate relative positions corresponding to the orientation of the Figure on a properly oriented page, and may not reflect the proper orientation of any device as implemented.

Certain features that are described in this specification in the context of separate aspects also can be implemented in combination in a single aspect. Conversely, various features that are described in the context of a single aspect also can be implemented in multiple aspects separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this may not be understood as requiring that such operations be performed in the particular order shown or in sequential order, or that all illustrated operations be performed, to achieve desirable results. Further, the drawings may schematically depict one more example processes in the form of a flow diagram. However, other operations that are not depicted can be incorporated in the example processes that are schematically illustrated. For example, one or more additional operations can be performed before, after, simultaneously, or between any of the illustrated operations. In certain circumstances, multitasking and parallel processing may be advantageous. Moreover, the separation of various system components in the aspects described above may not be understood as requiring such separation in all aspects, and it may be understood that the described program components and systems can generally be integrated together in a single software product or packaged into multiple software products. Additionally, other aspects are within the scope of the following claims. In some cases, the actions recited in the claims can be performed in a different order and still achieve desirable results.

What is claimed is:

1. A method of wireless communication performed by a user equipment (UE), comprising:
receiving a downlink reference signal (DRS) transmission in a single channel occupancy time (COT), wherein a monitoring period for a paging opportunity is based at least in part on the DRS transmission;
receiving, during the monitoring period for the paging opportunity, signaling identifying a resource location of an end of the monitoring period for the paging opportunity;
monitoring for a paging transmission associated with the end of the monitoring period for the paging opportunity; and
ending the monitoring period for the paging opportunity based at least in part on the signaling identifying the resource location of the end of the monitoring period for the paging opportunity.

2. The method of claim 1, wherein the DRS transmission is received in the single COT in accordance with a DRS continuity requirement.

3. The method of claim 2, wherein achieving the DRS continuity requirement comprises at least one of:
monitoring multiple paging occasion (PO) candidates of a paging occasion window (POW) at a fixed location or based at least in part on a flexible mapping of detected DRSs or known quasi-co location (QCL) relationships to floating or fixed PO candidate locations; or
receiving the DRS transmission using a set of synchronization signal block (SSB) candidates when a network entity obtains access to transmission resources using a contention-based access procedure.

4. The method of claim 1, wherein the paging transmission is associated with a physical downlink control channel (PDCCH).

5. The method of claim 1, wherein the signaling comprises at least one of:
a paging radio network temporary identifier (P-RNTI)-scrambling of a downlink control information (DCI), or
a DCI explicitly carrying the signaling.

6. The method of claim 1, wherein the signaling further identifies a start of the monitoring period for the paging opportunity.

7. The method of claim 1, wherein the signaling further identifies criterion for altering the monitoring period for the paging opportunity.

8. The method of claim 1, wherein the signaling comprises a system information radio network temporary identifier (SI-RNTI).

9. A user equipment (UE) for wireless communication, comprising:
one or more memories; and
one or more processors coupled to the one or more memories, the one or more processors individually or collectively configured to:
obtain a downlink reference signal (DRS) transmission in a single channel occupancy time (COT), wherein a monitoring period for a paging opportunity is based at least in part on the DRS transmission;
obtain, during the monitoring period for the paging opportunity, signaling identifying a resource location of an end of the monitoring period for the paging opportunity;
monitor for a paging transmission associated with the end of the monitoring period for the paging opportunity; and
end the monitoring period for the paging opportunity based at least in part on the signaling identifying the resource location of the end of the monitoring period for the paging opportunity.

10. The UE of claim 9, wherein, to obtain the DRS transmission in the single COT, the one or more processors are configured to:
obtain the DRS transmission in the single COT in accordance with a DRS continuity requirement.

11. The UE of claim 10, wherein, to achieve the DRS continuity requirement, the one or more processors are configured to at least one of:
monitor multiple paging occasion (PO) candidates of a paging occasion window (POW) at a fixed location or based at least in part on a flexible mapping of detected DRSs or known quasi-co location (QCL) relationships to floating or fixed PO candidate locations; or
obtain the DRS transmission using a set of synchronization signal block (SSB) candidates when a network entity obtains access to transmission resources using a contention-based access procedure.

12. The UE of claim 9, wherein the paging transmission is associated with a physical downlink control channel (PDCCH).

13. The UE of claim 9, wherein the signaling is at least one of:
a paging radio network temporary identifier (P-RNTI)-scrambling of a downlink control information (DCI), or
a DCI explicitly carrying the signaling.

14. The UE of claim 9, wherein the signaling further identifies a start of the monitoring period for the paging opportunity.

15. The UE of claim 9, wherein the signaling further identifies criterion for altering the monitoring period for the paging opportunity.

16. The UE of claim 9, wherein the signaling comprises a system information radio network temporary identifier (SI-RNTI).

17. A non-transitory computer-readable medium storing a set of instructions for wireless communication, the set of instructions comprising:
one or more instructions that, when executed by one or more processors of a user equipment (UE), cause the UE to:
receive a downlink reference signal (DRS) transmission in a single channel occupancy time (COT), wherein a monitoring period for a paging opportunity is based at least in part on the DRS transmission;
receive, during the monitoring period for the paging opportunity, signaling identifying a resource location of an end of the monitoring period for the paging opportunity;
monitor for a paging transmission associated with the end of the monitoring period for the paging opportunity; and
end the monitoring period for the paging opportunity based at least in part on the signaling identifying the resource location of the end of the monitoring period for the paging opportunity.

18. The non-transitory computer-readable medium of claim 17, wherein the one or more instructions, that cause the UE to receive the DRS transmission in the single COT, cause the UE to:
   receive the DRS transmission in the single COT in accordance with a DRS continuity requirement.

19. The non-transitory computer-readable medium of claim 18, wherein the one or more instructions, that cause the UE to achieve the DRS continuity requirement, cause the UE to at least one of:
   monitor multiple paging occasion (PO) candidates of a paging occasion window (POW) at a fixed location or based at least in part on a flexible mapping of detected DRSs or known quasi-co location (QCL) relationships to floating or fixed PO candidate locations; or
   receive a set of synchronization signal block (SSB) candidates when a network entity obtains access to transmission resources using a contention-based access procedure.

20. The non-transitory computer-readable medium of claim 17, wherein the paging transmission is associated with a physical downlink control channel (PDCCH).

21. The non-transitory computer-readable medium of claim 17, wherein the signaling is at least one of:
   a paging radio network temporary identifier (P-RNTI)-scrambling of a downlink control information (DCI), or
   a DCI explicitly carrying the signaling.

22. The non-transitory computer-readable medium of claim 17, wherein the signaling further identifies a start of the monitoring period for the paging opportunity.

23. The non-transitory computer-readable medium of claim 17, wherein the signaling further identifies criterion for altering the monitoring period for the paging opportunity.

24. An apparatus for wireless communication, comprising:
   means for receiving a downlink reference signal (DRS) transmission in a single channel occupancy time (COT),
      wherein a monitoring period for a paging opportunity is based at least in part on the DRS transmission;
   means for receiving, during the monitoring period for the paging opportunity, signaling identifying a resource location of an end of the monitoring period for the paging opportunity;
   means for monitoring for a paging transmission associated with the end of the monitoring period for the paging opportunity; and
   means for ending the monitoring period for the paging opportunity based at least in part on the signaling identifying the resource location of the end of the monitoring period for the paging opportunity.

25. The apparatus of claim 24, wherein the means for receiving the DRS transmission in the single COT comprises:
   means for receiving the DRS transmission in the single COT in accordance with a DRS continuity requirement.

26. The apparatus of claim 25, wherein means for achieving the DRS continuity requirement comprises at least one of:
   means for monitoring multiple paging occasion (PO) candidates of a paging occasion window (POW) at a fixed location or based at least in part on a flexible mapping of detected DRSs or known quasi-co location (QCL) relationships to floating or fixed PO candidate locations; or
   means for receiving a set of synchronization signal block (SSB) candidates when a network entity obtains access to transmission resources using a contention-based access procedure.

27. The apparatus of claim 24, wherein the paging transmission is associated with a physical downlink control channel (PDCCH).

28. The apparatus of claim 24, wherein the signaling comprises at least one of:
   a paging radio network temporary identifier (P-RNTI)-scrambling of a downlink control information (DCI), or
   a DCI explicitly carrying the signaling.

29. The apparatus of claim 24, wherein the signaling further identifies a start of the monitoring period for the paging opportunity.

30. The apparatus of claim 24, wherein the signaling further identifies criterion for altering the monitoring period for the paging opportunity.

* * * * *